US011944970B2

United States Patent
Huang et al.

(10) Patent No.: US 11,944,970 B2
(45) Date of Patent: Apr. 2, 2024

(54) MICROFLUIDIC DETECTION UNIT AND FLUID DETECTION METHOD

(71) Applicants: INSTANT NANOBIOSENSORS, INC., Taipei (TW); INSTANT NANOBIOSENSORS CO., LTD., Taipei (TW)

(72) Inventors: Yu-Chung Huang, Taichung (TW); Yi-Li Sun, Tainan (TW); Ting-Chou Chang, Dounan Township, Yunlin County (TW); Jhy-Wen Wu, Baoshan Township, Hsinchu County (TW); Nan-Kuang Yao, Taoyuan (TW); Lai-Kwan Chau, Chiayi (TW); Shau-Chun Wang, Chiayi (TW); Ying Ting Chen, Tainan (TW)

(73) Assignees: INSTANT NANOBIOSENSORS, INC., Taipei (TW); INSTANT NANOBIOSENSORS CO., LTD., Taipei (TW)

( * ) Notice: Subject to any disclaimer, the term of this patent is extended or adjusted under 35 U.S.C. 154(b) by 630 days.

(21) Appl. No.: 17/053,313

(22) PCT Filed: Jun. 10, 2019

(86) PCT No.: PCT/US2019/036288
§ 371 (c)(1),
(2) Date: Nov. 5, 2020

(87) PCT Pub. No.: WO2020/251526
PCT Pub. Date: Dec. 17, 2020

(65) Prior Publication Data
US 2021/0252502 A1    Aug. 19, 2021

(51) Int. Cl.
*B01L 3/00*  (2006.01)
*G01N 31/20*  (2006.01)

(52) U.S. Cl.
CPC .......... *B01L 3/50273* (2013.01); *G01N 31/20* (2013.01); *B01L 2400/0406* (2013.01); *B01L 2400/0457* (2013.01)

(58) Field of Classification Search
CPC ..... B01L 2200/0621; B01L 2200/0684; B01L 2300/0681; B01L 2300/069;
(Continued)

(56) References Cited

U.S. PATENT DOCUMENTS 7,517,499 B2 *  4/2009  Kahl ...................... G02B 21/34
422/504
2001/0034064 A1  10/2001  Turner
(Continued)

OTHER PUBLICATIONS

Gao et al."Droplet microfluidics with gravity-driven overflow system" Chemical Engineering Journal, vol. 362, 2019, pp. 169-175 (Year: 2019).*

*Primary Examiner* — Jennifer Wecker
*Assistant Examiner* — Jonathan Bortoli
(74) *Attorney, Agent, or Firm* — Muncy, Geissler, Olds & Lowe, P.C.

(57) ABSTRACT

A microfluidic detection unit comprises at least one fluid injection section, a fluid storage section and a detection section. Each fluid injection section defines a fluid outlet; the fluid storage section is in gas communication with the atmosphere and defines a fluid inlet; the detection section defines a first end in communication with the fluid outlet and a second end in communication with the fluid inlet. A height difference is defined between the fluid outlet and the fluid inlet along the direction of gravity. When a first fluid is injected from the at least one fluid injection section, the first fluid is driven by gravity to pass through the detection section and accumulate to form a droplet at the fluid inlet, such that a state of fluid pressure equilibrium of the first fluid is established.

20 Claims, 24 Drawing Sheets

(58) Field of Classification Search
CPC ..... B01L 2400/0406; B01L 2400/0457; B01L 3/502723; B01L 3/50273; G01N 15/0612; G01N 2015/0065; G01N 2015/0687; G01N 31/20

See application file for complete search history.

(56) References Cited

U.S. PATENT DOCUMENTS

| | | |
|---|---|---|
| 2002/0084185 A1 | 7/2002 | Sundberg |
| 2005/0045479 A1* | 3/2005 | Weigl ............... F16K 99/0061 204/603 |
| 2007/0297949 A1* | 12/2007 | Wu ................. B01L 3/502753 422/400 |
| 2008/0277494 A1 | 11/2008 | Davies |
| 2011/0000560 A1 | 1/2011 | Miller |
| 2012/0241013 A1* | 9/2012 | Linder ............. B01L 3/502746 422/68.1 |
| 2018/0104693 A1 | 4/2018 | Merten |

* cited by examiner

MICROFLUIDIC DETECTION UNIT AND FLUID DETECTION METHOD

BACKGROUND

1. Field of the Disclosure

The present disclosure relates to a microfluidic detection unit and more particularly to a microfluidic detection unit operable without requiring a driving device used for driving the fluid during detection. Further disclosed herein is a fluid detection method.

2. Description of Related Art

In the biotech or medical field, fluid samples containing specific substances, molecules or target analytes are routinely tested, analyzed, or detected. Detection of a target analyte in fluid samples is usually performed based on fluid properties or biochemical or chemical reactions occurring in the fluid samples. With the advancement of technology, microfluidic techniques have also been vigorously developed and widely used in fluid sample analysis. The application of microfluidic techniques in fluid sample analysis may greatly reduce the amount of fluid sample required and the size of equipment; however, conventional microfluidic detection components, in order to drive the motion of the fluid sample contained therein, generally require a driving device as a fluid driving source, such as a vacuum pump, a power supply or a pneumatic device. If the driving device fails to operate properly, the microfluidic detection component will lose its function and therefore cause inconvenience to users.

In addition, most conventional microfluidic detection components are designed as disposable components and are not reusable after a single test. Frequent replacement of the microfluidic detection components will cause substantial increase in costs and time of fluid sample analysis.

Accordingly, it is a primary object of the present disclosure to provide a microfluidic detection component to address the aforesaid problems and issues.

SUMMARY

Disclosed herein is a microfluidic detection unit which, without requiring a driving device, drives fluid by gravity during detection and enables multiple fluid sample injections and detections.

To achieve the aforesaid and other objects, the microfluidic detection unit of the present disclosure comprises a substrate. The substrate defines a bottom surface which is substantially perpendicular to the direction of gravity. The substrate comprises at least one fluid injection section, a fluid storage section and a detection section. Each fluid injection section defines a fluid outlet; the fluid storage section is in gas (e.g., air) communication with the atmosphere and defines a fluid inlet; the detection section defines a first end and a second end, the first end being in communication with the fluid outlet of the fluid injection section, and the second end being in communication with the fluid inlet of the fluid storage section. A height difference is defined between the fluid outlet of the fluid injection section and the fluid inlet of the fluid storage section along a direction of gravity such that the fluid outlet of the fluid injection section has a gravitational potential of greater than that of the fluid inlet of the fluid storage section. When a first fluid is injected from the at least one fluid injection section, the first fluid is driven by gravity to pass through the detection section and accumulate to form a droplet at the fluid inlet of the fluid storage section, such that a gravitational potential and a capillary force opposite to the direction of gravity of a portion of the first fluid defined from the fluid outlet to a level of the same height as a surface of the droplet are offset to establish a state of fluid pressure equilibrium.

In one embodiment of the present disclosure, the at least one fluid injection section comprises a first fluid injection section and a second fluid injection section, the first fluid injection section being in communication with the first end of the detection section via a first channel, and the second fluid injection section being in communication with the first end of the detection section via a second channel.

In one embodiment of the present disclosure, the fluid outlet of the second fluid injection section is above the fluid outlet of the first fluid injection section in the direction of gravity.

In one embodiment of the present disclosure, the second channel has a cross-sectional size of greater than that of the first channel.

In one embodiment of the present disclosure, the second channel is communicated with the first channel, such that the second fluid injection section is in communication with the first end of the detection section via the second channel and the first channel.

In one embodiment of the present disclosure, the fluid outlet defines a fluid buffer section at an intersection of the fluid injection section and the fluid outlet.

In one embodiment of the present disclosure, the fluid buffer section is at least a portion of a columnar (e.g., cylindrical) space or a spherical space or has a curved surface structure.

In one embodiment of the present disclosure, the fluid buffer section is provided therein with a porous material.

In one embodiment of the present disclosure, the porous material is selected from any one or a combination of polysulfone, cellulose ester, regenerated cellulose, polyethersulfone, polyarylethersulfone, polyvinyl alcohol and polyacrylic acid sodium salt.

In one embodiment of the present disclosure, the fluid storage section is provided therein with a porous material, and a spacing section is defined to prevent contact between the porous material and the fluid inlet of the fluid storage section.

In one embodiment of the present disclosure, the porous material is selected from any one or a combination of polysulfone, cellulose ester, regenerated cellulose, polyethersulfone, polyarylethersulfone, polyvinyl alcohol and polyacrylic acid sodium salt.

In one embodiment of the present disclosure, the fluid storage section further defines a fluid collection section between the spacing section and the fluid inlet for regulating an amount of the fluid flowing into the fluid storage section.

In one embodiment of the present disclosure, the fluid storage section further defines an isolation structure for separating the fluid collection section and the spacing section.

In one embodiment of the present disclosure, the detection section is provided with a detection component.

In one embodiment of the present disclosure, the detection component is an optical waveguide component.

In one embodiment of the present disclosure, the optical waveguide component is an optical fiber.

In one embodiment of the present disclosure, the optical fiber has a nanoparticle layer coated on an unclad surface of a fiber core of the optical fiber.

In one embodiment of the present disclosure, the detection section is provided with a reactive material.

In one embodiment of the present disclosure, the microfluidic detection unit further comprises at least one atmosphere communication channel for maintaining the gas communication between the fluid storage section and the atmosphere.

In one embodiment of the present disclosure, the microfluidic detection unit further comprises at least one cover for covering at least one side of the substrate.

In one embodiment of the present disclosure, the first end and the second end of the detection section are below the fluid outlet of the fluid injection section in the direction of gravity.

In one embodiment of the present disclosure, the height difference defined between the fluid outlet and the fluid inlet along the direction of gravity ranges from 0.5 cm to 10 cm.

The fluid detection method of the present disclosure comprises the following steps: providing a microfluidic detection unit which comprises a detection section, at least one fluid injection section and a fluid storage section; injecting a first fluid from the at least one fluid injection section, such that the first fluid is driven by gravity to pass through the detection section and accumulate to form a droplet at the fluid inlet of the fluid storage section, and a gravitational potential and a capillary force opposite to the direction of gravity of a portion of the first fluid defined from a fluid outlet of the at least one fluid injection section to a level of the same height as a surface of the droplet are offset to establish a state of fluid pressure equilibrium; and detecting the first fluid in the detection section.

In one embodiment of the present disclosure, the fluid detection method further comprises: injecting a second fluid from the at least one fluid injection section and reducing an amount of the droplet accumulated, so as to drive the first fluid to leave the detection section and enable the second fluid to pass through the detection section until a gravitational potential and a capillary force opposite to the direction of gravity of a portion of the second fluid defined from the fluid outlet to a level of the same height as the surface of the droplet are offset to establish the state of fluid pressure equilibrium.

In one embodiment of the present disclosure, a porous material is disposed in the vicinity of the fluid inlet without contact with the fluid inlet to absorb an excessive amount of the droplet accumulated.

In one embodiment of the present disclosure, a fluid collection section is defined in the vicinity of the fluid inlet, such that when the amount of the droplet accumulated is greater than a volume of the fluid collection section, the droplet overflows from the fluid collection section to reduce the amount of the droplet accumulated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the descriptions, serve to explain the principles of the invention.

DESCRIPTION OF THE EMBODIMENTS

Since various aspects and embodiments are merely exemplary and not limiting, after reading this specification, skilled artisans appreciate that other aspects and embodiments are possible without departing from the scope of the disclosure. Other features and benefits of any one or more of the embodiments will be apparent from the following detailed description and the claims.

As used herein, "a," "an" or similar expression is employed to describe elements and components of the present disclosure. This is done merely for convenience and to give a general sense of the scope of the present disclosure. Accordingly, this description should be read to include one or at least one and the singular also includes the plural unless it is obvious to mean otherwise.

As used herein, ordinal numbers "first," "second," and the like are used for distinguishing between or referring to identical or similar components or structures and not necessarily for describing a sequential or chronological order thereof. It should be understood that ordinal numbers are interchangeable in some situations or configurations without affecting the implementation of the present disclosure.

As used herein, the terms "comprises," "comprising," "includes," "including," "has," "having" and any other variation thereof are intended to cover a non-exclusive inclusion. For example, a component or structure that comprises a list of elements is not necessarily limited to only those elements but may include other elements not explicitly listed or inherent to such component or structure.

As used herein, the term "fluid" broadly refers to a fluid sample containing specific ingredients, molecules or target analytes, such as water, beverage, milk, blood, body fluid, and other similar fluid specimens, but not limited thereto; the term "fluid detection" refers to carrying out detection or analysis on an analyte in the fluid sample.

Figure 1:
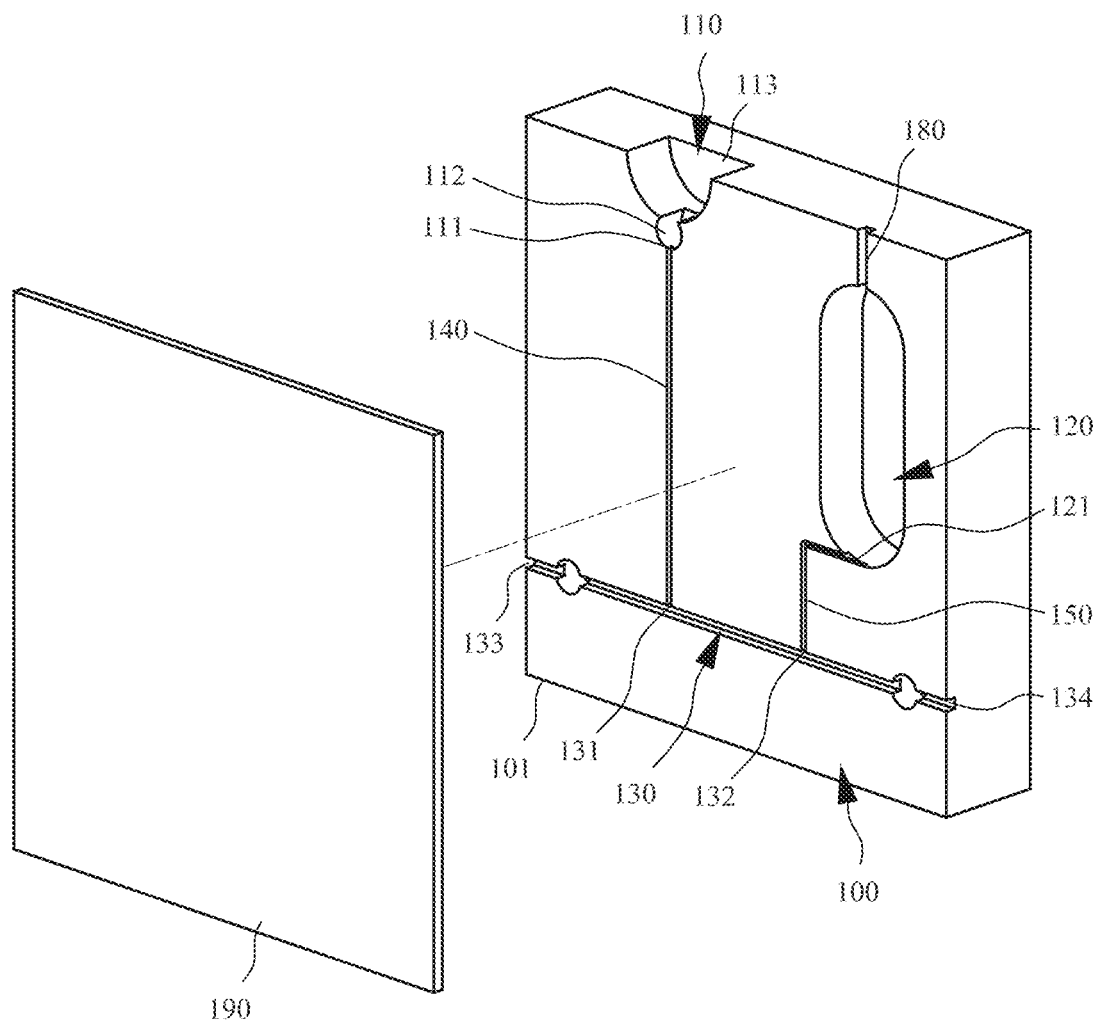
FIG. 1 illustrates the exploded view of a first embodiment of the microfluidic detection unit of the present disclosure.

FIG. 1 illustrates the exploded view of a first embodiment of the microfluidic detection unit of the present disclosure. As shown in FIG. 1, according to the first embodiment, the microfluidic detection unit 1 comprises a substrate 100. The substrate 100 may be made from rigid materials resistant to deformation and allowing easy production, such as poly (methyl methacrylate) (PMMA) and other plastic materials, but not limited thereto. The substrate 100 defines a bottom surface 101. In this embodiment, the bottom surface 101 is a plane substantially perpendicular to the direction of gravity; in other words, the bottom surface 101 is substantially a horizontal plane, such that during the fluid detection of the microfluidic detection unit 1, the bottom surface 101 of the substrate 100 may be arranged and placed on another horizontal plane to ensure structural and operational stability of the microfluidic detection unit 1; however, the bottom surface 101 may also be configured as a plane, curved surface, or irregular surface not perpendicular to the direction of gravity and is not limited to this embodiment. In this embodiment, the substrate 100 may be a 3-dimensional block substrate, such as a rectangular block which has a size of 50*50*10 $mm^2$; however, the shape and size of the substrate 100 are not limited to the aforesaid embodiment.

The microfluidic detection unit 1 according to the present disclosure may further comprise at least one cover 190 for covering at least one side of the substrate 100. The cover 190 may be made from the same material as the substrate 100 or from other different rigid materials or plastic film materials, such as but not limited to polystyrene (PS), polyvinyl chloride (PVC) or the like. In this embodiment, as an example and without limitation thereto, because the fluid path of the substrate 100 for fluid flowing and detection is generally arranged on the same side of the substrate 100 and not penetrating to the opposite side, the cover 190 may therefore be covered on one side of the substrate 100 configured with the fluid path, such that the microfluidic detection unit 1 may be communicated with the atmosphere only through the fluid injection structure and the atmosphere communication structure, and such that the fluid path of the substrate 100 may form a substantially closed path suitable for fluid driving and detection. For example, in another embodiment of the present disclosure, according to different design needs, the fluid path of the substrate 100 may penetrate from one side of the substrate 100 to the other opposite side, such that the substrate 100 may be covered by two or more covers 190 at the two opposites to form a substantially closed path of the fluid path of the substrate 100. Undoubtedly, depending on the fluid detection device used in conjunction with the microfluidic detection unit 1, a substrate 100 not having a cover 190 may also be employed. Therefore, the presence or absence of the cover 190 and its amount may be determined and adjusted according to the design needs of the substrate 100.

Figure 2:
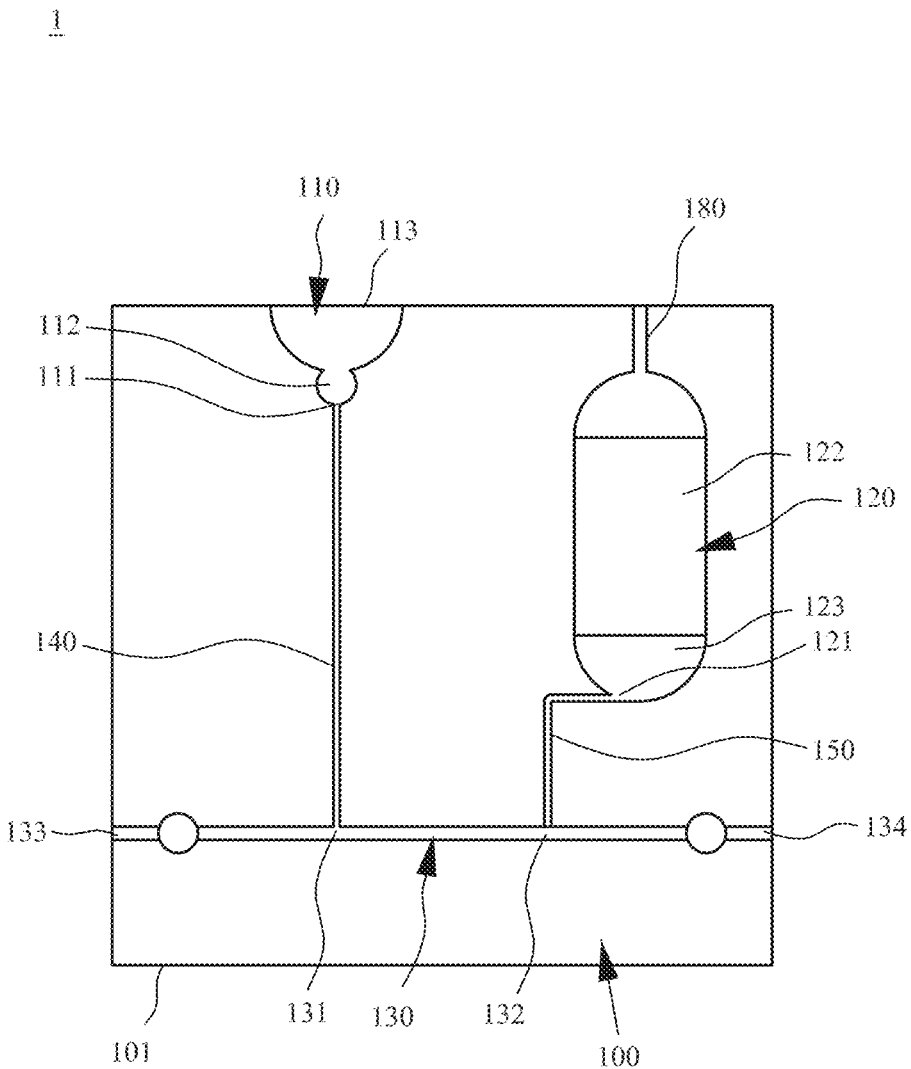
FIG. 2 illustrates the side view of the substrate of a first embodiment of the microfluidic detection unit of the present disclosure.

Refer now to both FIG. 1 and FIG. 2. FIG. 2 illustrates the side view of the substrate of a first embodiment of the microfluidic detection unit of the present disclosure. As illustrated in FIG. 1 and FIG. 2, in this embodiment, the substrate 100 comprises a fluid injection section 110, a fluid storage section 120 and a detection section 130. The detection section 130 has two ends communicated respectively with the fluid injection section 110 and the fluid storage section 120; that is, the fluid injection section 110 is in communication with the fluid storage section 120 via the detection section 130.

The fluid injection section 110 is configured to receive and temporarily store the fluid loaded to the substrate 100. The fluid injection section 110 defines a fluid outlet 111 and an opening 113. The opening 113 is configured on the surface of one side of the substrate 100 to communicate with the atmosphere, and the fluid injection section 110 is recessed from the opening 113 toward the interior of the substrate 100 and extended to the fluid outlet 111. The opening 113 has a cross-sectional size (i.e., cross-sectional area) of greater than that of the fluid outlet 111, such that the fluid injection section 110 is configured as a structure tapered from the opening 113 toward the fluid outlet 111, which is advantageous for the fluid in the fluid injection section 110 to flow toward the fluid outlet 111; the fluid may then leave the fluid injection section 110 from the fluid outlet 111 for detection. In this embodiment, the fluid injection section 110 may be at least a portion of a columnar space, a conical space or a hemispherical space, such as a hemi-cylindrical space disclosed in this embodiment, and the fluid injection section 110 is configured to have a funnel structure at the portion adjacent to the fluid outlet 111; however, the present disclosure is not limited thereto. The shortest distance between the fluid outlet 111 of the fluid injection section 110 and the bottom surface 101 is the vertical distance between the fluid outlet 111 and the bottom surface 101.

In addition, in this embodiment, the fluid outlet 111 defines a fluid buffer section 112. The fluid buffer section 112 is arranged at the intersection of the fluid injection section 110 and the fluid outlet 111. The fluid buffer section 112 may form a space for temporarily store fluid, such that a fluid injected from the fluid injection section 110 will pass through the fluid buffer section 112 of the fluid outlet 111 and then leave the fluid injection section 110. When the fluid injection section 110 contains some residual fluid, the residual fluid will be collected in the fluid buffer section 112 to form a droplet. In one embodiment of the present disclosure, the fluid buffer section 112 is configured as at least a portion of a columnar space or a spherical space or has a curved surface structure, such as a partially cylindrical space disclosed in this embodiment, so as to facilitate collection of the residual fluid and formation of the droplet.

In one embodiment of the present disclosure, the fluid buffer section 112 may be provided therein with a porous material. The porous material may filter the fluid sample under analysis and enhance the fluid collection and temporary storage functions of the fluid buffer section 112. The porous material may be selected from any one or a combination of polysulfone (PS), cellulose ester (CE), regenerated cellulose (RC), polyethersulfone (PES), polyarylethersulfone (PAES), polyvinyl alcohol (PVA) and polyacrylic acid sodium salt (PAAS), but not limited thereto.

The fluid storage section 120 is configured to receive and store the detected fluid. The fluid storage section 120 may be configured and designed to form gas (e.g., air) communication with the external atmosphere to facilitate fluid flowing in the substrate 100. The fluid storage section 120 defines a fluid inlet 121, from which the detected fluid may flow into the fluid storage section 120 for storage or accumulation. In this embodiment, a portion of the fluid storage section 120 close to the fluid inlet 121 is configured as a funnel-like structure to enable the fluid flowing from the fluid inlet 121 to the fluid storage section 120 to easily converge and accumulate at a position close to the fluid inlet 121; however, the present disclosure is not limited thereto. The shortest distance between the fluid inlet 121 of the fluid storage section 120 and the bottom surface 101 is the vertical distance between the fluid inlet 121 and the bottom surface 101.

In the present disclosure, a height difference is defined between the fluid outlet 111 of the fluid injection section 110 and the fluid inlet 121 of the fluid storage section 120 along the direction of gravity. For example, relative to the same bottom surface 101, the shortest distance between the fluid outlet 111 of the fluid injection section 110 and the bottom surface 101 is greater than the shortest distance between the fluid inlet 121 of the fluid storage section 120 and the bottom surface 101, such that a height difference is defined between the fluid outlet 111 of the fluid injection section 110 and the fluid inlet 121 of the fluid storage section 120 along the direction of gravity. In one embodiment of the present disclosure, the height difference defined between the fluid outlet 111 of the fluid injection section 110 and the fluid inlet 121 of the fluid storage section 120 along the direction of gravity ranges from 0.5 cm to 10 cm. Accordingly, the fluid at the fluid outlet 111 of the fluid injection section 110 has a gravitational potential of greater than that of the fluid at the fluid inlet 121 of the fluid storage section 120.

In one embodiment of the present disclosure, the fluid storage section 120 may contain therein a porous material 122 for absorbing and storing the fluid flowing into the fluid storage section 120. The porous material 122 may similarly be selected from any one or a combination of polysulfone, cellulose ester, regenerated cellulose, polyethersulfone, polyarylethersulfone, polyvinyl alcohol and polyacrylic acid sodium salt. In addition, in this embodiment, a spacing section 123 is defined between the porous material 122 and the fluid inlet 121 of the fluid storage section 120; the spacing section 123 separates and prevents the contact of the porous material 122 and the fluid inlet 121 of the fluid storage section 120 to preserve a constant space which may increase the volume of fluid converging and accumulating around the fluid inlet 121.

The microfluidic detection unit 1 further comprises at least one atmosphere communication channel 180 for maintaining the gas communication between the fluid storage section 120 and the atmosphere. In this embodiment, the microfluidic detection unit 1 is configured with one single atmosphere communication channel 180, which has one end in direct communication with the fluid storage section 120 and the other end extended to the surface on one side of the substrate 100 to communicate with the atmosphere; however, the position and number of the atmosphere communication channel 180 may be varied according to different design needs and are not limited to this embodiment.

The detection section 130 is primarily configured to detect (i.e., analysis) the fluid. The detection section 130 has a micro-channel structure, and in this embodiment, the detection section 130 is configured as a linear micro-channel but is not limited thereto. The detection section 130 defines a first end 131 and a second end 132. The first end 131 is communicated with the fluid outlet 111 of the fluid injection section 110 via the input channel 140, such that the fluid under detection may flow from the fluid injection section 110 along the input channel 140 and pass through the first end 131 of the detection section 130 to enter the detection section 130. The second end 132 is communicated with the fluid inlet 121 of the fluid storage section 120 via the output channel 150, such that the fluid which has been detected may leave the detection section 130 from the second end 132 of the detection section 130 and flow through the output channel 150 into the fluid storage section 120. In this embodiment, relative to the bottom surface 101 of the substrate 100, the first end 131 and the second end 132 of the detection section 130 are both below or lower than the fluid outlet 111 of the fluid injection section 110 in the direction of gravity, such that the fluid leaving from the fluid injection section 110 can be driven by gravity to flow toward the detection section 130.

As disclosed herein, the detection section 130 may be provided therein with various detection components or reactive materials as needed, such that the fluid flowing in the detection section 130 may be detected by the detection components or reactive materials to achieve the purpose of fluid detection. The detection component may be an optical waveguide component, such as an optical fiber or a component with a similar function, which may be inserted in the micro-channel structure of the detection section 130. For example, in one embodiment of the present disclosure, the optical fiber may have its outer protective layer stripped off to expose the fiber core, such that the surface of the fiber core may be pre-coated with a gold nanoparticle layer. The gold nanoparticle layer may further be modified by different recognition units according to the detection need; as used herein, a recognition unit refers to a unit which comprises a plurality of recognition molecules capable of recognizing a specific analyte, and the recognition molecules may be for example enzymes, antibodies, nucleic acids, organic small molecules, etc. Different recognition units are applicable to the detection of different substances to increase the fluid detection performance, but the present disclosure is not thereto. Corresponding to the arrangement of an optical waveguide component, such as an optical fiber, the detection section 130 may be provided with a light incident section 133 in the vicinity of the first end 131 and provided with a light exiting section 134 in the vicinity of the second end 132 for emitting and receiving a light beam respectively. In addition, in this embodiment, an encapsulation adhesive can be filled in the space between the first end 131 of the detection section 130 and the light incident section 133 and between the second end 132 of the detection section 130 and the light exiting section 134, such that the fluid is able to enter and leave the detection section 130 only from the input channel 140 and the output channel 150 respectively, but the present disclosure is not limited thereto.

Figure 3:
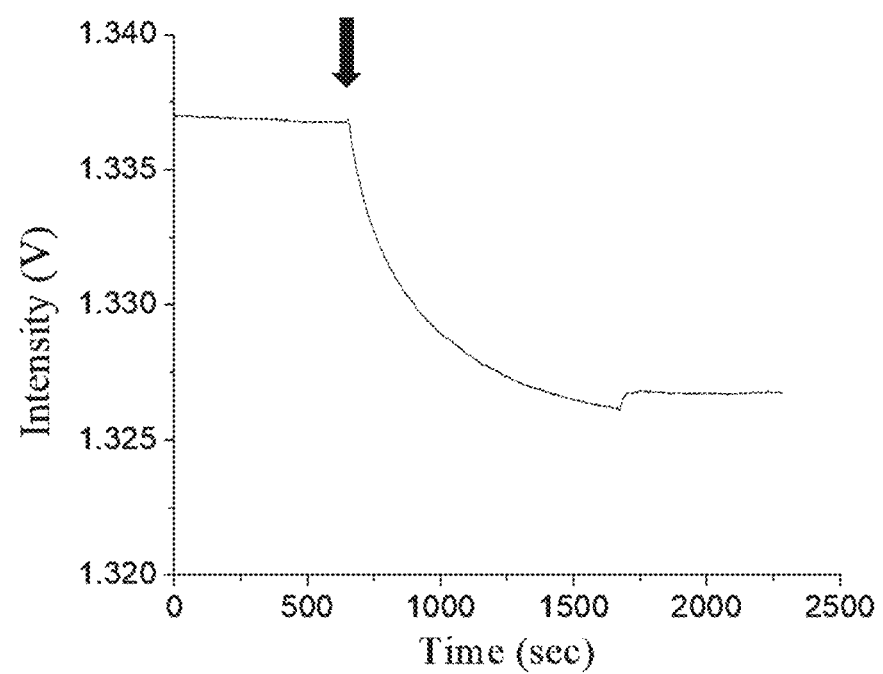
FIG. 3 illustrates the light intensity change during fluid analysis by the microfluidic detection unit of the present disclosure.

Refer now to FIG. 2 and FIG. 3. FIG. 3 illustrates the light intensity change during fluid detection by the microfluidic detection unit of the present disclosure. As shown in FIG. 2, in the first embodiment of the microfluidic detection unit 1 of the present disclosure, the detection section 130 is provided therein with an optical fiber pre-modified by a recognition unit, an external light source is used to emit a light beam from the light incident section 133 toward the detection section 130, and a light receiver is used to receive the light leaving from the detection section 130 at the light exiting section 134, so as to detect the fluid in the detection section 130. When the recognition molecules bind with the analyte molecules contained in the fluid flowing through the detection section 130, the particle plasmon resonance of the gold nanoparticle layer will be altered, such that the intensity of light beam received by the light receiver will vary correspondingly. In the experiment described below, the first embodiment of the microfluidic detection unit 1 is used at room temperature to conduct fluid detection, and the recognition unit modifying the optical fiber is anti-immunoglobulin G. As shown in FIG. 3, at the initial phase of detection, a buffer solution is served as the fluid and injected to the microfluidic detection unit 1; the buffer solution flows to the detection section 130, and a state of fluid pressure equilibrium is reached, during which the light intensity is stable and no significant variation is measured. After a period of time, a buffer solution containing immunoglobulin G is served as the fluid and injected to the microfluidic detection unit 1 to allow the fluid to flow to the detection section 130 and reach a state of fluid pressure equilibrium. As the point indicated by the arrow symbol in FIG. 3, when the recognition molecules (anti-immunoglobulin G) and the analyte molecules (immunoglobulin G) in the fluid bind, the light intensity measured begins to drop, representing a dynamic equilibrium gradually formed by molecular interaction. According to the aforesaid property, the detection result may be applied to the quantitation of an analyte.

In addition, according to the present disclosure, the above-mentioned reactive materials may be directly coated or formed on the surface of the micro-channel of the detection section 130. The biochemical or chemical reaction between the reactive materials and the fluid flowing through the detection section 130 may be utilized to achieve the purpose of fluid detection. The microfluidic detection unit 1 according to the present disclosure may use a proper reactive material to meet different fluid detection needs. For example, in one embodiment of the present disclosure, the reactive material may contain iron oxide to be coated on the surface of the micro-channel of the detection section 130. When a mixed solution containing a luminol reagent and hydrogen peroxide flows through the detection section 130, under the catalysis of iron ions, hydrogen peroxide is decomposed to produce oxygen and water, and oxygen thus produced will oxidize the luminol reagent to emit blue light, which is applicable to detecting hydrogen peroxide to perform blood analysis. The aforesaid reaction is also known as a chemoluminescence reaction.

Moreover, in another embodiment of the present disclosure, the reactive material may be selected from a DNA fragment partially complementary to the analyte to modify the surface of the micro-channel of the detection section 130, and the fluid to be detected may be added with a gold nanoparticle solution, wherein the surface of the gold nanoparticle may be functionalized and modified with a DNA probe partially complementary to the analyte. When the fluid containing the analyte flows through the detection section 130, a hybridization reaction occurs and the gold nanoparticle is captured in the detection section 130, such that a color difference can be distinguished before and after the capture of the gold nanoparticle to allow quantitative analysis of DNA. The quantitative analysis is also known as the colorimetry analysis.

Figure 4:
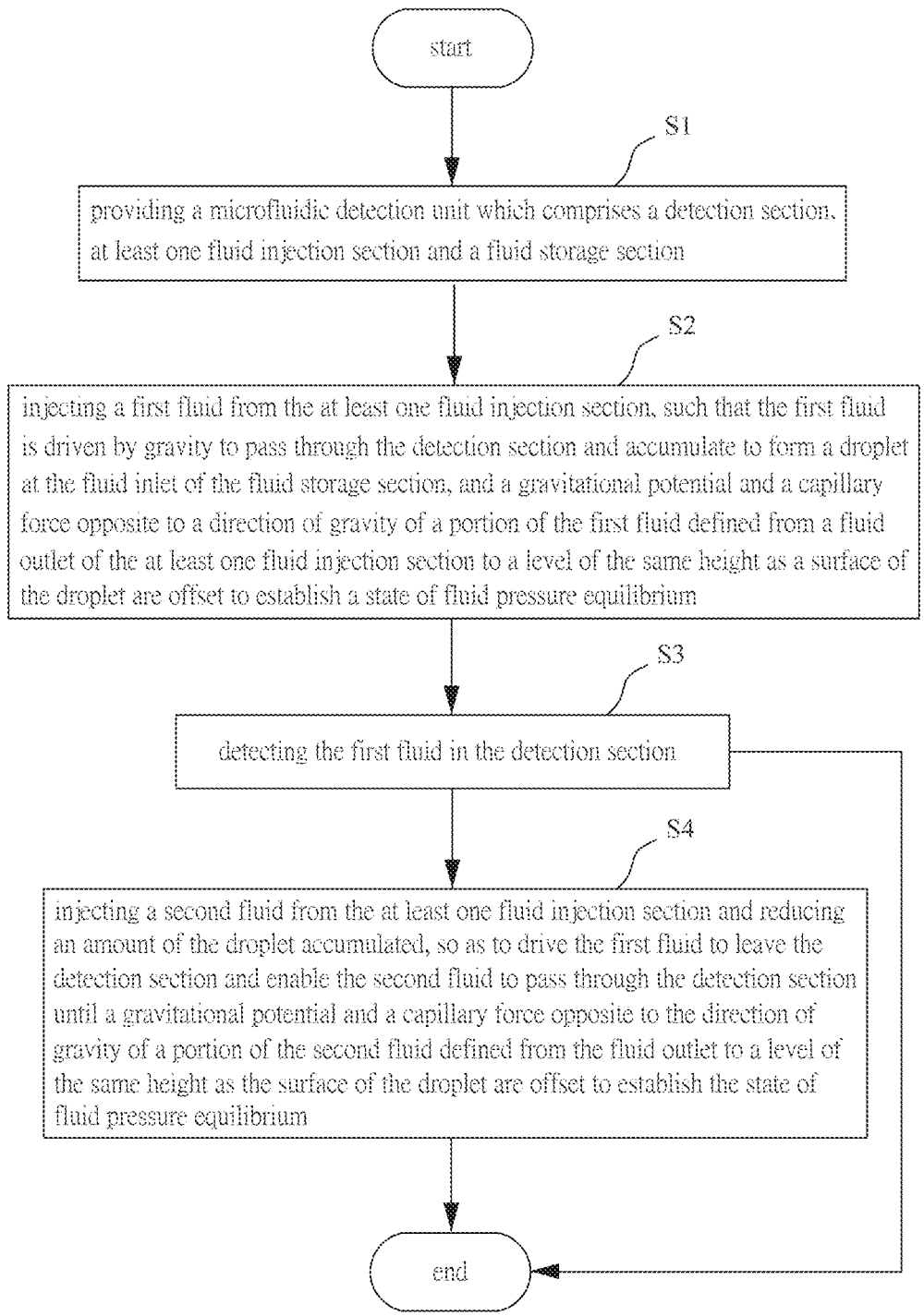
FIG. 4 illustrates the flowchart of the fluid detection method of the present disclosure.

The fluid detection method according to the present disclosure will be described in detail by reference to the first embodiment of the microfluidic detection unit 1 as illustrated above. Refer now to FIG. 2 and FIG. 4 to FIG. 5E. FIG. 4 illustrates the flowchart of the fluid detection method of the present disclosure, and FIG. 5A to FIG. 5E illustrate the process of operating the first embodiment of the microfluidic detection unit of the present disclosure. As shown in FIG. 4, the fluid detection method of the present disclosure mainly comprises steps S1 to S3. Each step of the method will be elaborated in detail below:

Step S1: providing a microfluidic detection unit which comprises a detection section, at least one fluid injection section and a fluid storage section.

First, a microfluidic detection unit as disclosed herein is provided to carry out fluid detection. The microfluidic detection unit comprises a detection section, at least one fluid injection section and a fluid storage section. By reference to the first embodiment of the microfluidic detection unit 1 described above, as shown in FIG. 2, the microfluidic detection unit 1 has a substrate 100 which comprises a detection section 130, a fluid injection section 110 and a fluid storage section 120. The bottom surface 101 of the substrate 100 of the microfluidic detection unit 1 may be set on any horizontal surface (i.e., a surface substantially perpendicular to the direction of gravity), such that the microfluidic detection unit 1 is substantially perpendicular to the horizontal surface.

Step S2: injecting a first fluid from the at least one fluid injection section, such that the first fluid is driven by gravity to pass through the detection section and accumulate to form a droplet at the fluid inlet of the fluid storage section, and a gravitational potential and a capillary force opposite to the direction of gravity of a portion of the first fluid defined from the fluid outlet of the at least one fluid injection section to a level of the same height as a surface of the droplet are offset to establish a state of fluid pressure equilibrium.

Figure 5A:
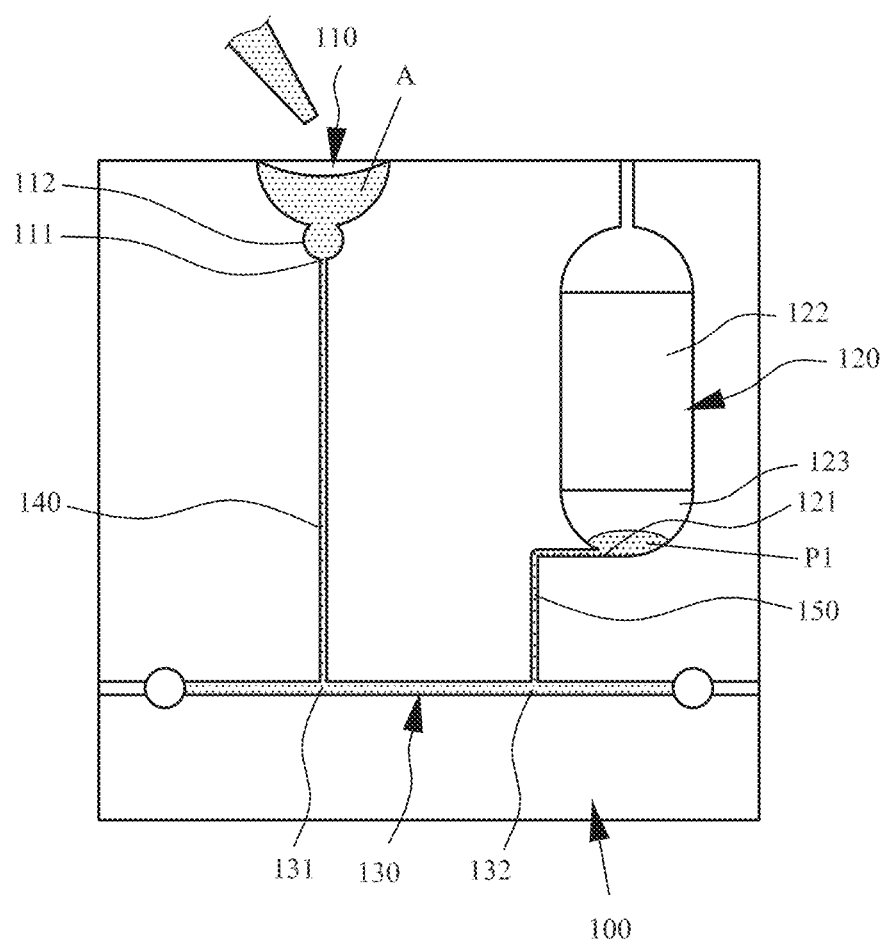
FIG. 5A to FIG. 5E illustrate the process of operating a first embodiment of the microfluidic detection unit of the present disclosure.
Figure 5B:
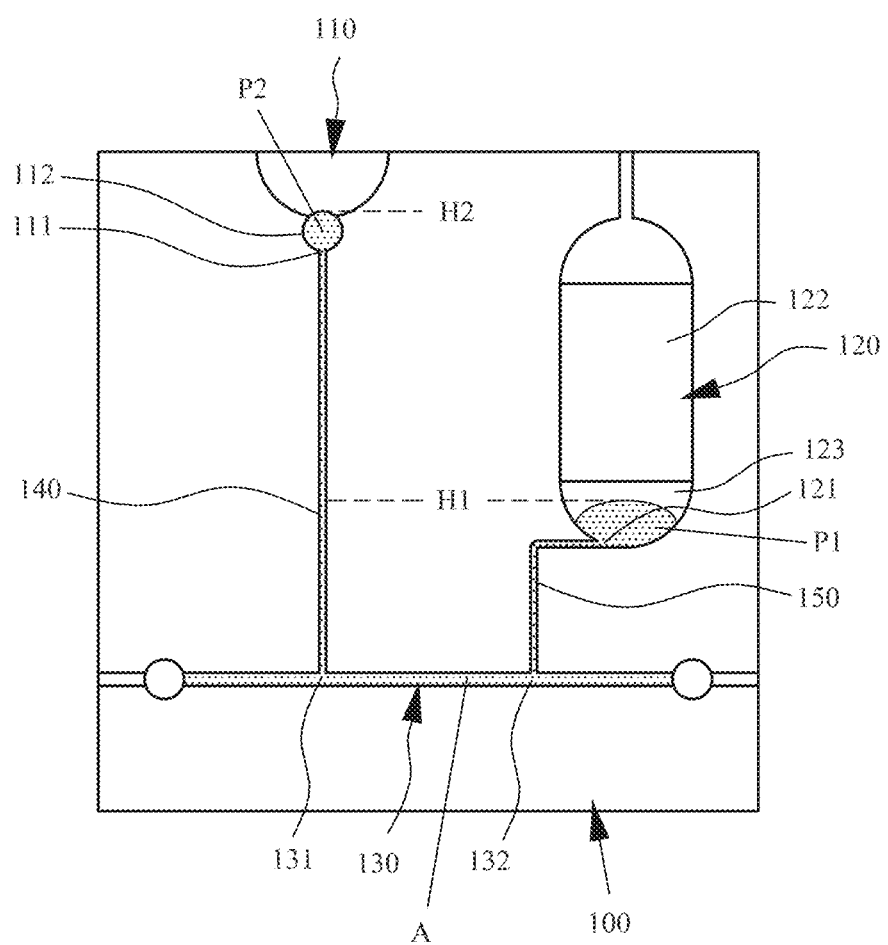

After providing the microfluidic detection unit 1 in Step S1, a sufficient amount of the first fluid A is injected as one batch or gradually to the fluid injection section 110 of the microfluidic detection unit 1. As shown in FIG. 5A, the first fluid A in the fluid injection section 110 will be driven by gravity to pass through the fluid buffer section 112 of the fluid outlet 111 and flow to the detection section 130 from the first end 131 of the detection section 130 along the input channel 140; then the first fluid A passes through the detection section 130 and then leaves the detection section 130 from the second end 132 of the detection section 130 due to the law of communicating vessels and then flows toward the fluid storage section 120 along the output channel 150, such that the first fluid A converges at the fluid inlet 121 of the fluid storage section 120 to form a droplet P1 which gradually expands toward the porous material 122 as its accumulation amount increases. Because a spacing section 123 is arranged between the fluid inlet 121 and the porous material 122, the droplet P1 is allowed to accumulate to a certain amount. When the first fluid A in the microfluidic detection unit 1 has accumulated to a sufficient volume such that the first fluid A remaining in the fluid injection section 110 is converged at the fluid buffer section 112 of the fluid outlet 111 to form a droplet P2, a capillary force opposite to the direction of gravity formed by a portion of the first fluid A defined from the droplet P2 (a position H2 as shown in FIG. 5B) to a level of the same height as a surface of the upper edge of the droplet P1 (a position H1 as shown in FIG. 5B) will offset a gravitational potential between the droplet P2 and a level of the same height as a surface of the upper edge of the droplet P1. As such, the first fluid A in the microfluidic detection unit 1 will stop flowing due to the state of fluid pressure equilibrium, as illustrated in FIG. 5B. At that moment, further injection of the first fluid A to the fluid injection section 110 can be stopped.

Step S3: detecting the first fluid in the detection section.

After establishing a state of fluid pressure equilibrium by the first fluid A in the microfluidic detection unit 1 as described in Step S2, the detection section 130 will be stably filled with the first fluid A, during which a predetermined detection may be carried out on the first fluid A in the detection section 130. In this embodiment, the detection section 130 may be provided therein with an optical fiber, an external light source is used to emit a light beam from the light incident section 133 close to the first end 131 toward the detection section 130, and a light receiver is used to receive the light beam leaving from the detection section 130 at the light exiting section 134 close to the second end 132. The detection result of the first fluid A may be obtained by analyzing the received light beam, but the fluid detection mechanism employed by the present disclosure is not limited thereto.

Accordingly, the fluid detection method of the present disclosure may increase fluid detection performance by using the microfluidic detection unit described above which utilizes gravity to drive fluid flowing without requiring a driving device and which achieves a stable internal fluid pressure equilibrium by a simple structural configuration design.

In addition, the fluid detection method of the present disclosure may also be applied to multiple fluid injections and detections. As shown in FIG. 4, in this embodiment, after Step S3, the fluid detection method of the present disclosure further comprises Step S4: injecting a second fluid from the at least one fluid injection section and reducing the amount of the droplet accumulated, so as to drive the first fluid to leave the detection section and enable the second fluid to pass through the detection section until a gravitational potential and a capillary force opposite to the direction of gravity of a portion of the second fluid defined from the fluid outlet to a level of the same height as the surface of the droplet P1 are offset to establish the state of fluid pressure equilibrium.

Figure 5C:
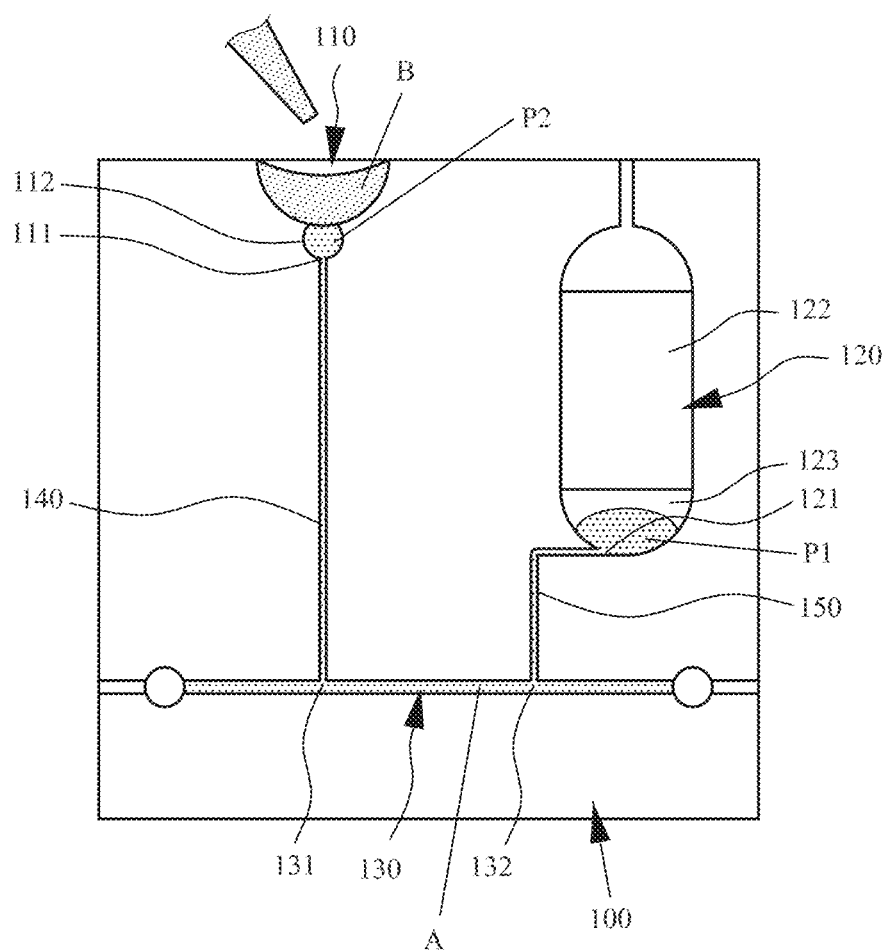
Figure 5D:
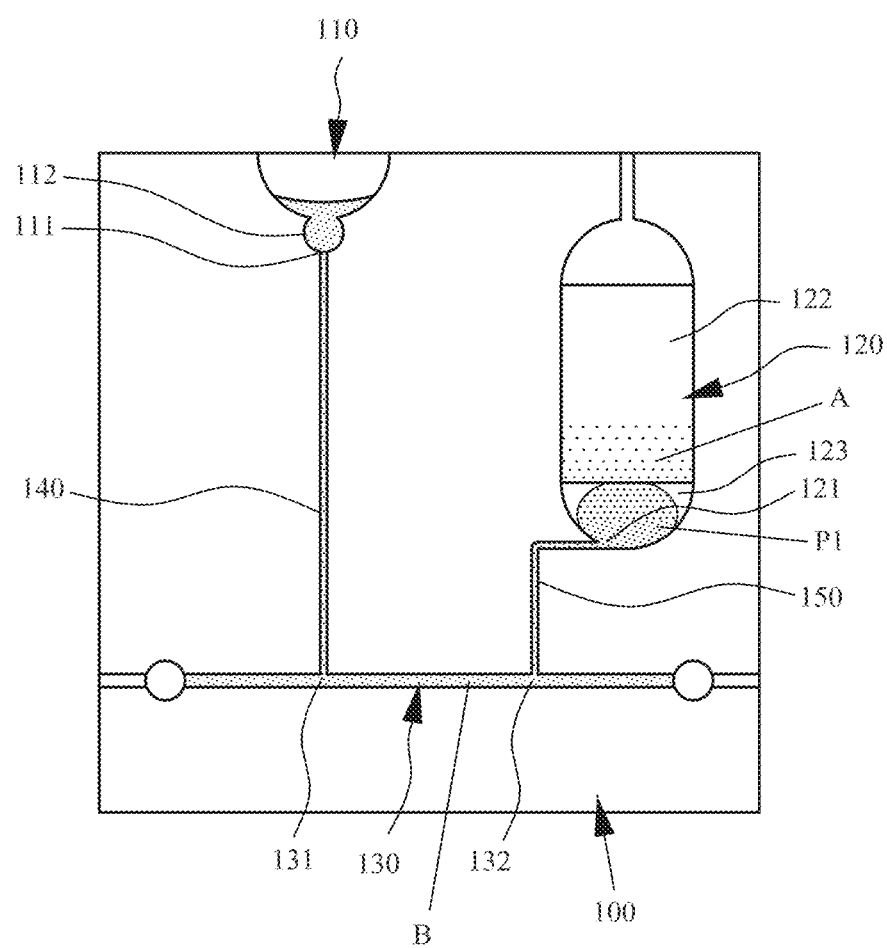

After the detection of the first fluid A in Step S3, as shown in FIG. 5C, a sufficient amount of the second fluid B is then injected as one batch or gradually to the fluid injection section 110 of the microfluidic detection unit 1. Since the first fluid A has formed the droplet P2 in the fluid buffer section 112 of the fluid outlet 111, the injected second fluid B can be prevented from forming bubbles due to the quick connection of the two fluids. The injected second fluid B increases the pressure in the fluid injection section 110 and breaks the fluid pressure equilibrium formed by the first fluid A in the microfluidic detection unit 1; thus, the first fluid A will be entirely pushed by the second fluid B and moved toward the fluid storage section 120, such that the accumulated amount of the droplet P1 increases gradually until it is in contact with the porous material 122. At that moment, the droplet P1 being in contact with the porous material 122 will be absorbed by the porous material 122, thereby rapidly reducing the accumulation amount of the droplet P1. As such, the presence of gravity further facilitates the first fluid A to leave from the detection section 130 and enables the second fluid B to flow into and through the detection section 130, as illustrated in FIG. 5D. Then the first fluid A in the detection section 130 is completely replaced by the second fluid B.

Figure 5E:
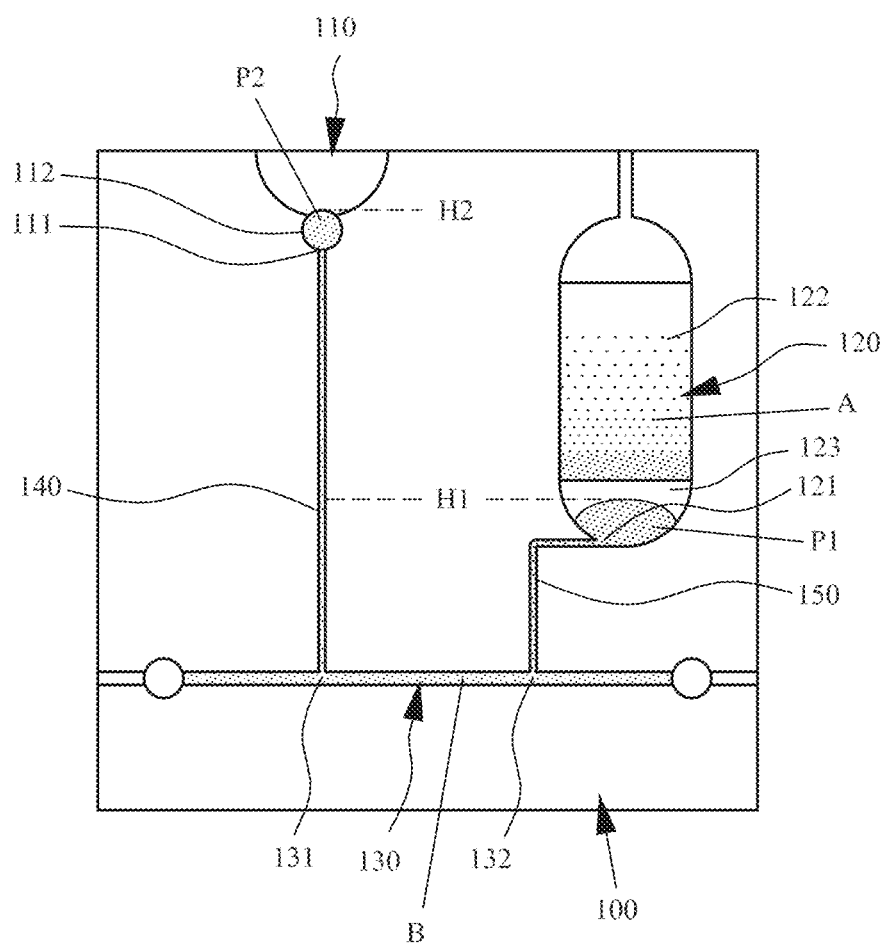

When the second fluid B in the microfluidic detection unit 1 has accumulated to a sufficient volume, the second fluid B remaining in the fluid injection section 110 will be converged at the fluid buffer section 112 of the fluid outlet 111 to form the droplet P2, and the excessive amount of the droplet P1 will be absorbed by the porous material 122 until the accumulated droplet P1 is no longer in contact with the porous material 122 and resumes to a state of fluid pressure equilibrium as described above, during which a capillary force opposite to the direction of gravity is similarly formed by a portion of the second fluid B defined from the droplet P2 (a position H2 as shown in FIG. 5E) formed by the second fluid B to a level of the same height as a surface of the upper edge of the droplet P1 (a position H1 as shown in FIG. 5E), so as to offset a gravitational potential between the droplet P2 and a level of the same height as a surface of the upper edge of the droplet P1. As such, the second fluid B in the microfluidic detection unit 1 will stop flowing due to the state of fluid pressure equilibrium, as illustrated in FIG. 5E.

At that moment, further injection of the second fluid B to the fluid injection section 110 can be stopped.

The aforesaid second fluid B can be chosen from a different fluid as needed. For example, the second fluid B may be another fluid to be detected or analyzed, and when the second fluid B in the microfluidic detection unit 1 has reached the state as illustrated in FIG. 5E, the fluid detection as described in Step S3 may be proceeded. In addition, the second fluid B may also be a fluid for washing purpose, such as an aqueous solution or other washing solutions. Therefore, as described in the aforesaid Step S4, the second fluid B may be loaded to wash the channels in the microfluidic detection unit 1 to prepare for the next fluid detection operation.

Therefore, the fluid detection method according to the present disclosure, by using the microfluidic detection unit according to the present disclosure, may allow multiple injections of the same or different fluids to achieve the purposes of fluid detection and washing, and one single microfluidic detection unit may accomplish multiple fluid detection operations, which saves detection costs and increases the fluid detection efficiency.

Figure 6:
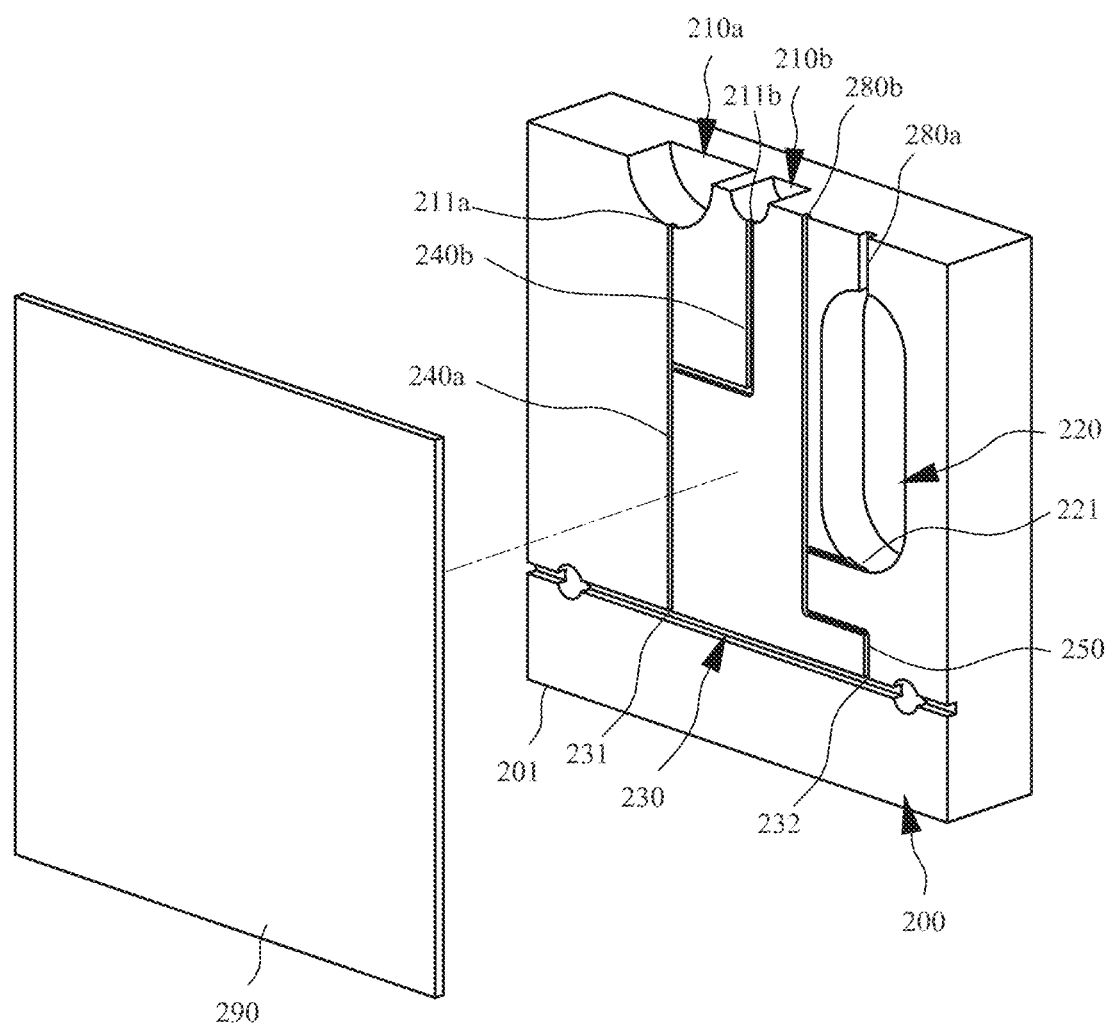
FIG. 6 illustrates the exploded view of a second embodiment of the microfluidic detection unit of the present disclosure.
Figure 7:
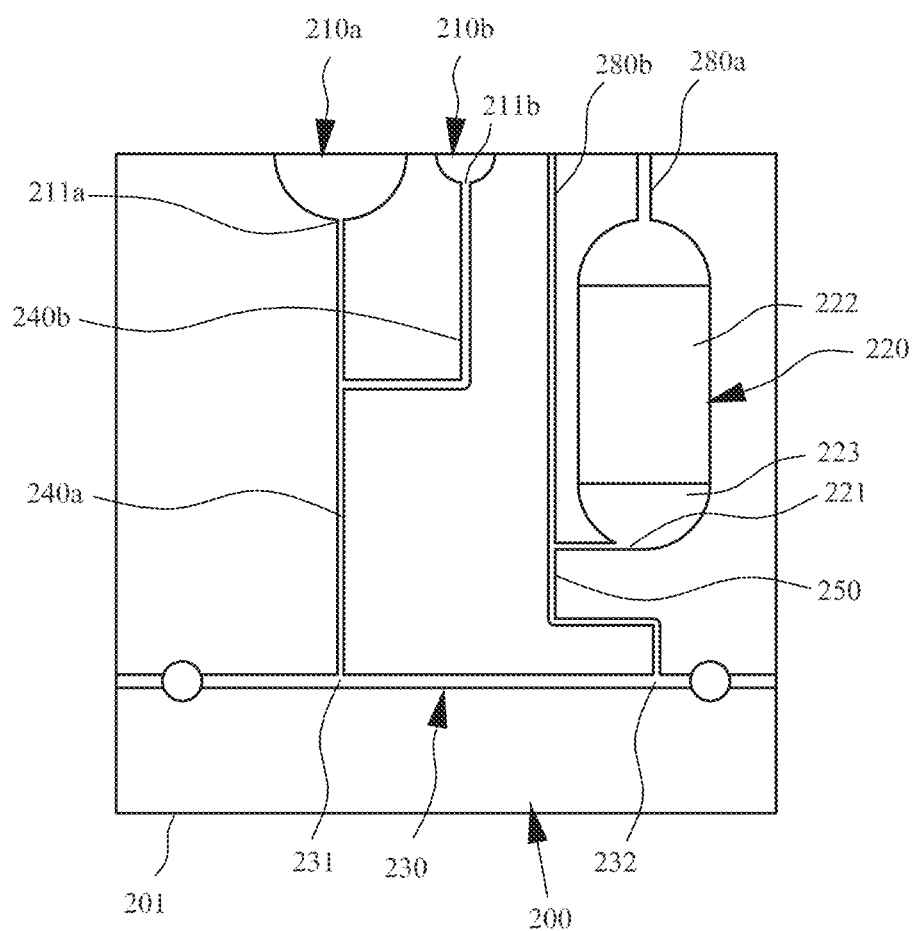
FIG. 7 illustrates the side view of the substrate of a second embodiment of the microfluidic detection unit of the present disclosure.

Refer now to FIG. 6 and FIG. 7. FIG. 6 illustrates the exploded view of a second embodiment of the microfluidic detection unit of the present disclosure, and FIG. 7 illustrates the side view of the substrate of a second embodiment of the microfluidic detection unit of the present disclosure. The second embodiment of the microfluidic detection unit is a variation of the first embodiment, in which the number of the fluid injection section and channel configuration are changed, the fluid buffer section of the fluid outlet is removed, and the remaining structural designs and functions are identical to the first embodiment and are therefore omitted for brevity.

As shown in FIG. 6 and FIG. 7, in the second embodiment of the microfluidic detection unit 2 according to the present disclosure, the microfluidic detection unit 2 comprises a substrate 200 and a cover 290 covered on one side of the substrate 200. The substrate 200 comprises a first fluid injection section 210a, a second fluid injection section 210b, a fluid storage section 220 and a detection section 230. The first fluid injection section 210a is communicated with the first end 231 of the detection section 230 from the fluid outlet 211a via the first channel 240a, and the second fluid injection section 210b is communicated with the first end 231 of the detection section 230 from the fluid outlet 211b via the second channel 240b; the fluid storage section 220 is communicated with the second end 232 of the detection section 230 from the fluid inlet 221 via the output channel 250. In this embodiment, the second channel 240b is communicated with the first channel 240a, such that the second fluid injection section 210b is in communication with the first end 231 of the detection section 230 via the second channel 240b and the first channel 240a, but the configuration of the second channel 240b is not limited to this embodiment. The shortest distance between the first fluid injection section 210a from the fluid outlet 211a and the bottom surface 201 is the vertical distance between the fluid outlet 211a and the bottom surface 201, the shortest distance between the second fluid injection section 210b from the fluid outlet 211b and the bottom surface 201 is the vertical distance between the fluid outlet 211b and the bottom surface 201, and the shortest distance between the fluid inlet 221 of the fluid storage section 220 and the bottom surface 201 is the vertical distance between the fluid inlet 221 and the bottom surface 201.

In this embodiment, a height difference is defined between the fluid outlet 211a of the first fluid injection section 210a and the fluid outlet 211b of the second fluid injection section 210b along the direction of gravity, and height differences are defined along the direction of gravity from the fluid inlet 221 of the fluid storage section 220 to the fluid outlet 211a of the first fluid injection section 210a and to the fluid outlet 211b of the second fluid injection section 210b respectively. For example, relative to the same bottom surface 201, the fluid outlet 211b of the second fluid injection section 210b is above (i.e., higher than) the fluid outlet 211a of the first fluid injection section 210a in the direction of gravity, such that a height difference is defined between the fluid outlet 211b of the second fluid injection section 210b and the fluid outlet 211a of the first fluid injection section 210a along the direction of gravity. In addition, relative to the same bottom surface 201, the shortest distance between the first fluid injection section 210a from the fluid outlet 211a and the bottom surface 201 and the shortest distance between the second fluid injection section 210b from the fluid outlet 211b and the bottom surface 201 are both greater than the shortest distance between the fluid inlet 221 of the fluid storage section 220 and the bottom surface 201, such that the fluid outlet 211a of the first fluid injection section 210a and the fluid outlet 211b of the second fluid injection section 210b both define a height difference along the direction of gravity in respect to the fluid inlet 221 of the fluid storage section 220. Accordingly, the fluid at the fluid outlet 211b of the second fluid injection section 210b has a gravitational potential of greater than that of the fluid at the fluid outlet 211a of the first fluid injection section 210a, and the fluid at the fluid outlet 211a of the first fluid injection section 210a or at the fluid outlet 211b of the second fluid injection section 210b has a gravitational potential of greater than that of the fluid at the fluid inlet 221 of the fluid storage section 220.

Furthermore, in this embodiment, the second channel 240b has a cross-sectional size of greater than that of the first channel 240a, such that when the fluid is loaded to the second fluid injection section 210b, it can be driven by gravity to flow to the second channel 240b and form a pushing force sufficient to drive and move the fluid originally existing between the intersection of the first channel 240a and the second channel 240b and the first end 231 of the detection section 230, so as to allow multiple fluid injection operations.

Moreover, in this embodiment, the microfluidic detection unit 2 further comprises a first atmosphere communication channel 280a and a second atmosphere communication channel 280b. The first atmosphere communication channel 280a has one end in direct communication with the fluid storage section 220 and the other end extended to the surface on one side of the substrate 200 to communicate with the atmosphere; the second atmosphere communication channel 280b has one end in direct communication with the output channel 250 and the other end extended to the surface on one side of the substrate 200 to communicate with the atmosphere. The design described above enables the microfluidic detection unit 2 to provide multiple paths in communication with the atmosphere, such that the microfluidic detection unit 2 can perform fluid detection normally even when one atmosphere communication channel is blocked or clogged, and the fluid pressure in the microfluidic detection unit 2 may reach equilibrium more easily.

Figure 8A:
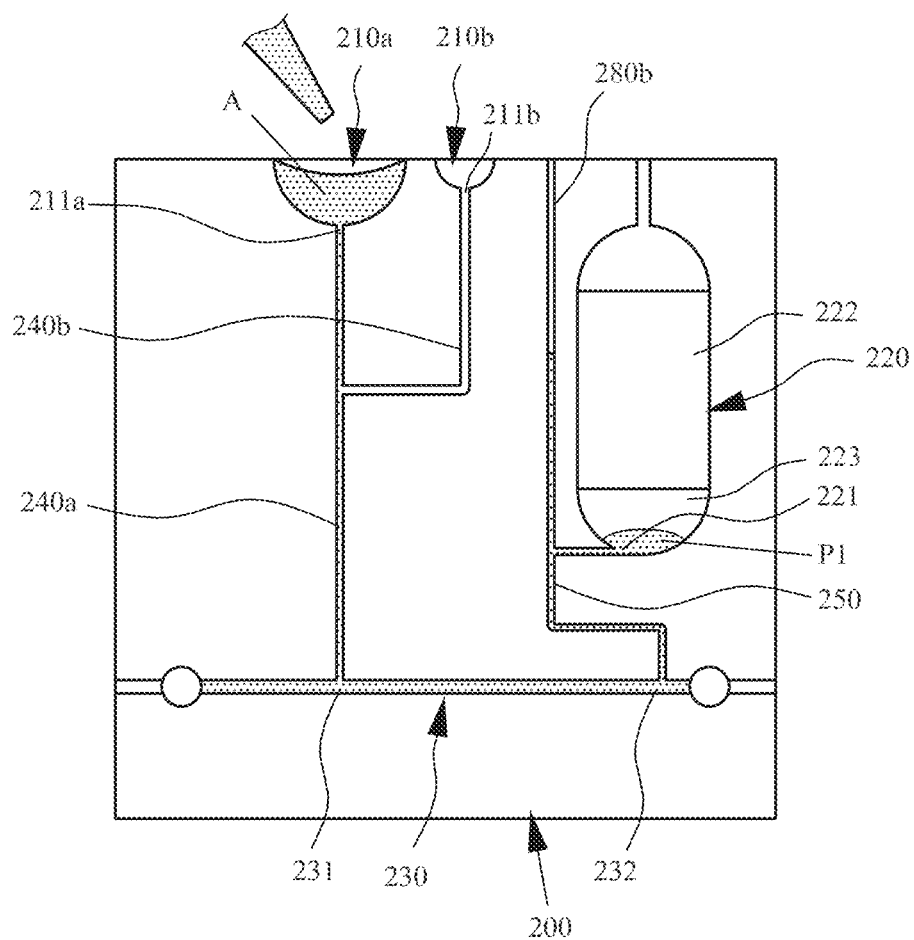
FIG. 8A to FIG. 8D illustrate the process of operating a second embodiment of the microfluidic detection unit of the present disclosure.
Figure 8B:
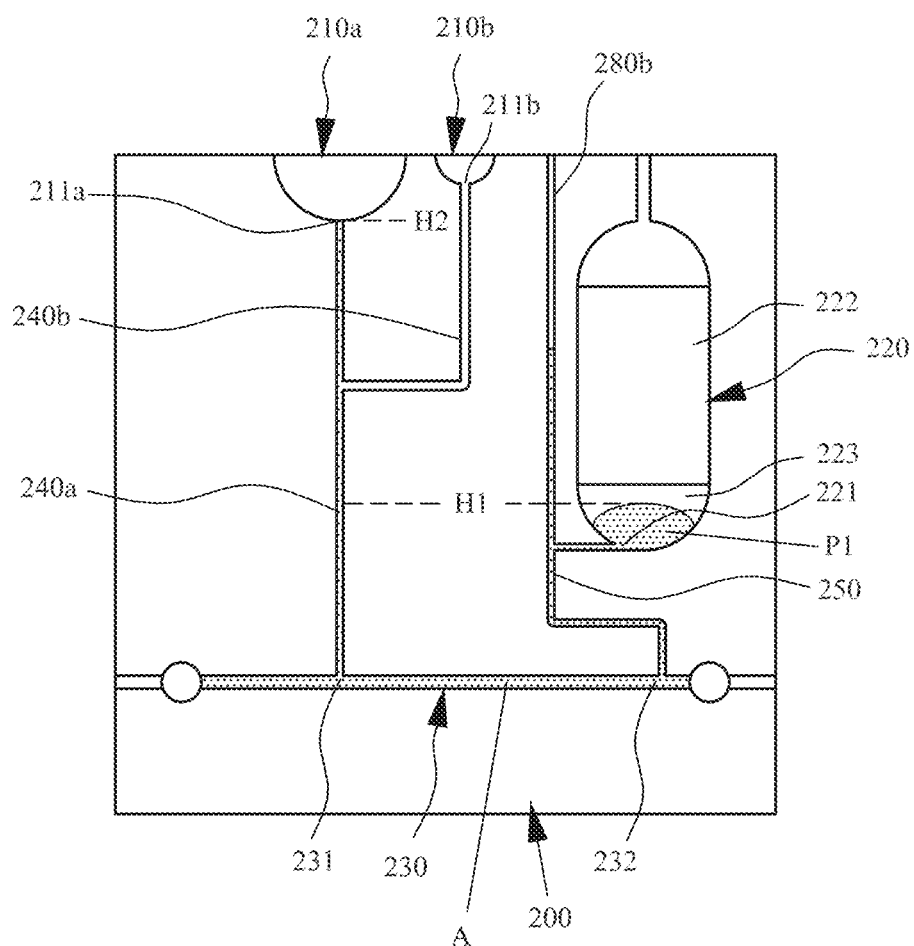
Figure 8C:
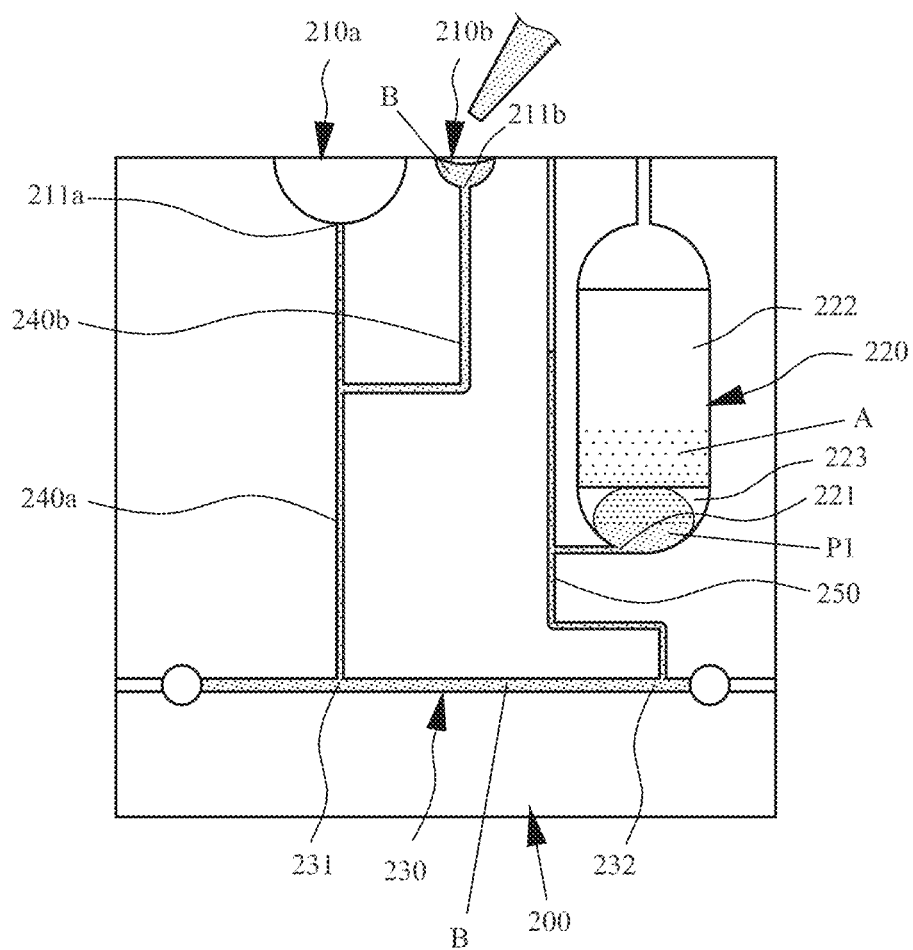
Figure 8D:
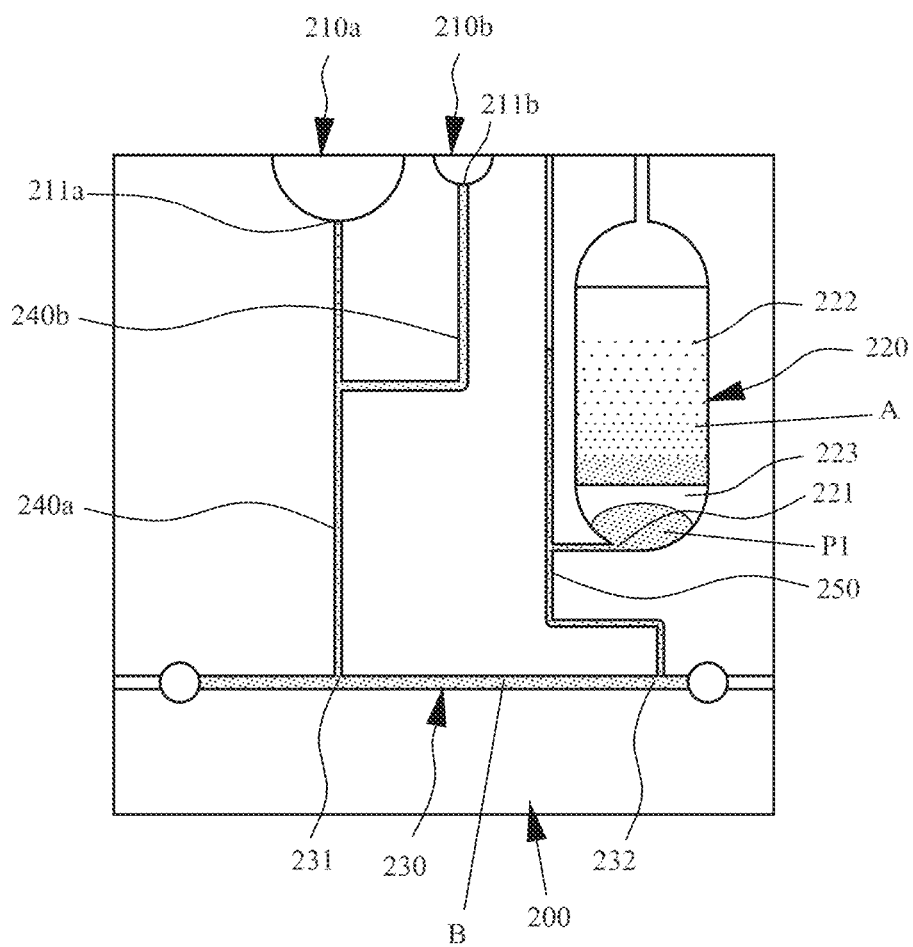

Refer now to FIG. 7 to FIG. 8D. FIG. 8A to FIG. 8D illustrate the process of operating the second embodiment of the microfluidic detection unit of the present disclosure. By reference to the second embodiment of the microfluidic detection unit 2 described above, as shown in FIG. 7, first the bottom surface 201 of the substrate 200 of the microfluidic detection unit 2 is set on any horizontal surface, such that the microfluidic detection unit 2 is substantially perpendicular to the horizontal surface to enable the subsequent fluid detection process.

Next, as shown in FIG. 8A, a sufficient amount of the first fluid A is injected as one batch or gradually to the first fluid injection section 210a of the microfluidic detection unit 2. The first fluid A in the first fluid injection section 210a will be driven by gravity to pass through the fluid outlet 211a and move along the first channel 240a from the first end 231 of the detection section 230 to the detection section 230; then the first fluid A passes through the detection section 230 and then leaves the detection section 230 from the second end 232 of the detection section 230 due to the law of communicating vessels and then flows toward the fluid storage section 220 along the output channel 250 (wherein a part of the first fluid A flows into the second atmosphere communication channel 280b), such that the first fluid A converges at the fluid inlet 221 of the fluid storage section 220 to form a droplet P1 which gradually expands toward the porous material 222 as its accumulation amount increases. Because a spacing section 223 is arranged between the fluid inlet 221 and the porous material 222, the droplet P1 is allowed to accumulate to a certain amount. When the first fluid A in the microfluidic detection unit 2 has accumulated to a sufficient volume and overflowed to the fluid outlet 211a of the first fluid injection section 210a, a capillary force opposite to the direction of gravity formed by a portion of the first fluid A in the first channel 240a defined from the fluid outlet 211a of the first fluid injection section 210a (a position H2 as shown in FIG. 8B) to a level of the same height as a surface of the upper edge of the droplet P1 (a position H1 as shown in FIG. 8B) will offset a gravitational potential between the fluid outlet 211a of the first fluid injection section 210a and a level of the same height as a surface of the upper edge of the droplet P1. As such, the first fluid A in the microfluidic detection unit 2 will stop flowing due to the state of fluid pressure equilibrium, as illustrated in FIG. 8B. At that moment, further injection of the first fluid A from the first fluid injection section 210a can be stopped, and the first fluid A in the detection section 230 may be detected.

After the detection of the first fluid A by using the microfluidic detection unit 2 of the present disclosure, the second fluid B may be selectively loaded from the first fluid injection section 210a or the second fluid injection section 210b of the microfluidic detection unit 2. As shown in FIG. 8C, in this embodiment, a sufficient amount of the second fluid B is injected as one batch or gradually to the second fluid injection section 210b of the microfluidic detection unit 2. The injected second fluid B increases the pressure in the second fluid injection section 210b and breaks the fluid pressure equilibrium formed by the first fluid A in the microfluidic detection unit 2; thus, the first fluid A below the intersection of the first channel 240a and the second channel 240b will be pushed by the second fluid B and move toward the fluid storage section 220, such that the accumulated amount of the droplet P1 increases gradually until it is in contact with the porous material 222. At that moment, the droplet P1 being in contact with the porous material 222 will be absorbed by the porous material 222, thereby rapidly reducing the accumulation amount of the droplet P1. Therefore, the presence of gravity further facilitates the first fluid A to leave from the detection section 230 and enables the second fluid B to flow into and through the detection section 230, such that the first fluid A in the detection section 230 is completely replaced by the second fluid B.

When the second fluid B in the microfluidic detection unit 2 has accumulated to a sufficient volume, the excessive amount of the droplet P1 will be absorbed by the porous material 222 until the remaining droplet P1 is no longer in contact with the porous material 222 and resumes to a state of fluid pressure equilibrium as described above, as shown in FIG. 8D. As such, the second fluid B in the microfluidic detection unit 2 will stop flowing due to the state of fluid pressure equilibrium, during which further injection of the second fluid B to the second fluid injection section 210b can be stopped, so as to use the second fluid B to achieve the washing purpose or to detect the second fluid B in the detection section 230. To use the microfluidic detection unit 2 of the present disclosure in multiple fluid injections, a same or different fluid may also be selectively loaded from the first fluid injection section 210a or the second fluid injection section 210b of the microfluidic detection unit 2.

Figure 9:
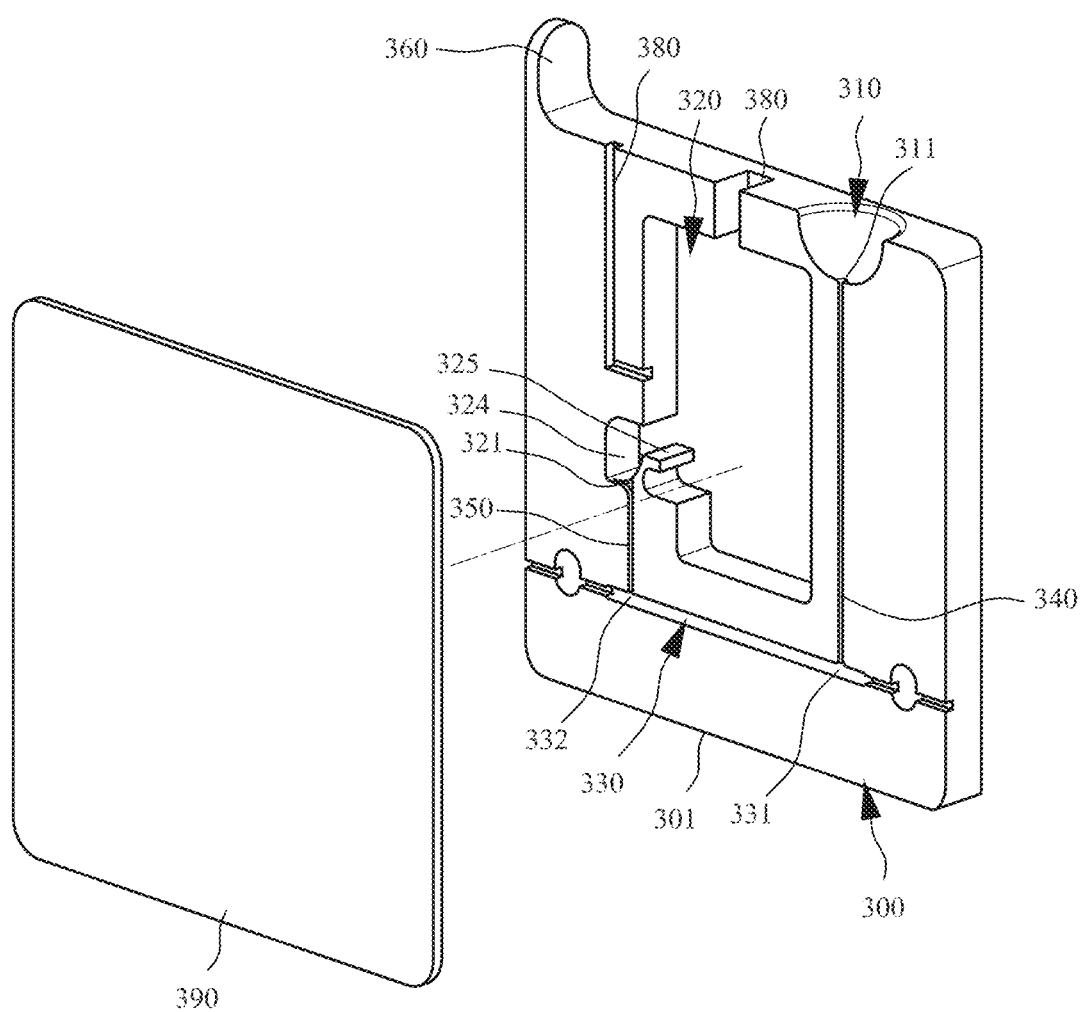
FIG. 9 illustrates the exploded view of a third embodiment of the microfluidic detection unit of the present disclosure.
Figure 10:
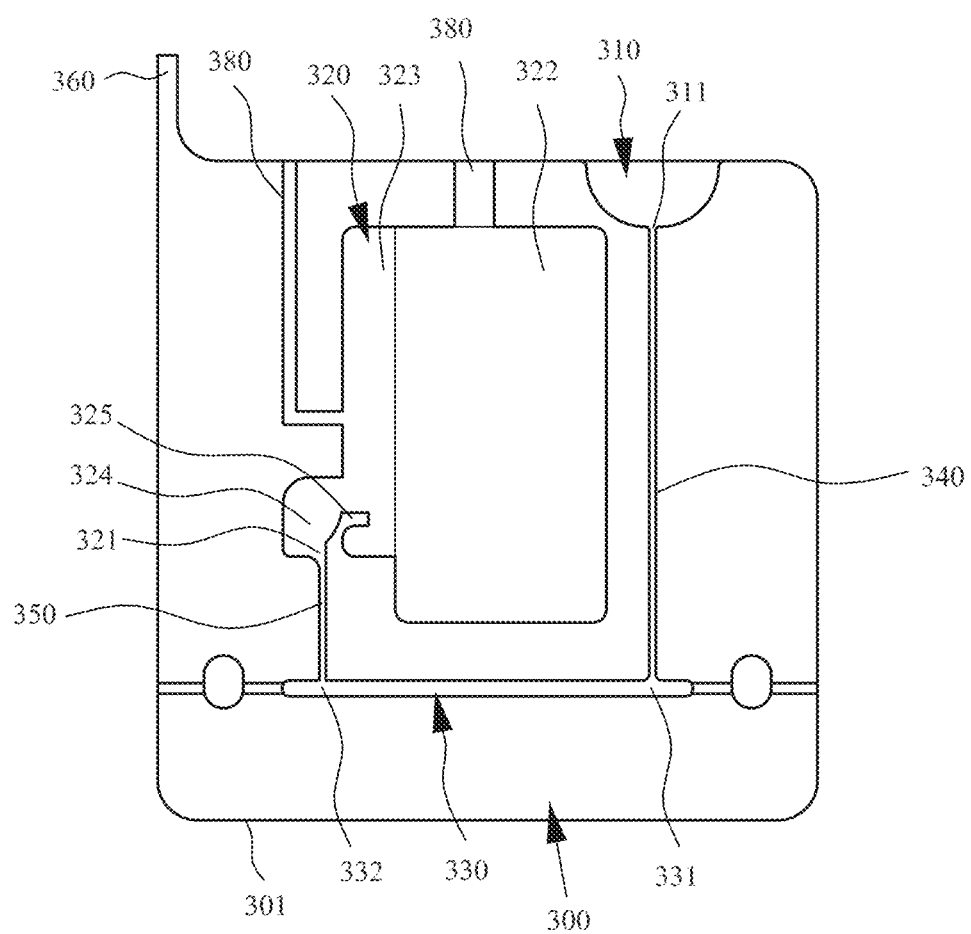
FIG. 10 illustrates the side view of the substrate of a third embodiment of the microfluidic detection unit of the present disclosure.

Refer now to FIG. 9 and FIG. 10. FIG. 9 illustrates the exploded view of a third embodiment of the microfluidic detection unit of the present disclosure, and FIG. 10 illustrates the side view of the substrate of a third embodiment of the microfluidic detection unit of the present disclosure. The third embodiment of the microfluidic detection unit is a variation of the first embodiment, in which the structure of the fluid storage section and channel configuration are changed, the fluid buffer section of the fluid outlet is removed, and the remaining structural designs and functions are identical to the first embodiment and are therefore omitted for brevity.

As shown in FIG. 9 and FIG. 10, in the third embodiment of the microfluidic detection unit 3 according to the present disclosure, the microfluidic detection unit 3 comprises a substrate 300 and a cover 390 covered on one side of the substrate 300. The substrate 300 comprises a fluid injection section 310, a fluid storage section 320 and a detection section 330. The fluid injection section 310 is communicated with the first end 331 of the detection section 330 from the fluid outlet 311 via the input channel 340, and the fluid storage section 320 is communicated with the second end 332 of the detection section 330 from the fluid inlet 321 via the output channel 350. The shortest distance between the fluid injection section 310 from the fluid outlet 311 and the bottom surface 301 is the vertical distance between the fluid outlet 311 and the bottom surface 301, and the shortest distance between the fluid inlet 321 of the fluid storage section 320 and the bottom surface 301 is the vertical distance between the fluid inlet 321 and the bottom surface 301. In addition, the substrate 300 may further comprise a grip portion 360 protruded from the surface on one side of the substrate 300. The grip portion 360 can be held by user's hand or by a tool to conveniently use the microfluidic detection unit 3 described herein.

In this embodiment, a height difference is defined between the fluid outlet 311 of the fluid injection section 310 and the fluid inlet 321 of the fluid storage section 320 along the direction of gravity. For example, relative to the same bottom surface 301, the shortest distance between the fluid outlet 311 of the fluid injection section 310 and the bottom surface 301 is greater than the shortest distance between the fluid inlet 321 of the fluid storage section 320 and the bottom surface 301, such that a height difference is defined between the fluid outlet 311 of the fluid injection section 310 and the fluid inlet 321 of the fluid storage section 320 along the direction of gravity. Accordingly, the fluid at the fluid outlet 311 of the fluid injection section 310 has a gravitational potential of greater than that of the fluid at the fluid inlet 321 of the fluid storage section 320.

A spacing section 323 is defined between the porous material 322 of the fluid storage section 320 and the fluid inlet 321; the spacing section 323 separates and prevents the contact of the porous material 322 and the fluid inlet 321 of the fluid storage section 320 to preserve a constant space. In addition, in this embodiment, the fluid storage section 320 further defines a fluid collection section 324. The fluid collection section 324 is arranged between the spacing section 323 and the fluid inlet 321. When the fluid flows to the fluid storage section 320 via the fluid inlet 321, the fluid collection section 324 may serve to temporarily accommodate the droplet formed by the converging fluid. When the amount of the droplet accumulated is greater than the volume of the fluid collection section 324, the droplet will overflow from the fluid collection section 324. Therefore, the fluid collection section 324 may be used to control or regulate the amount (i.e., size) of the droplet accumulated in the fluid storage section 320.

In addition, in this embodiment, the fluid storage section 320 further defines an isolation structure 325. The isolation structure 325 is used to isolate or separate the fluid collection section 324 and the spacing section 323 and served as a dam structure to prevent the droplet from overflowing from the fluid collection section 324. When the amount of the droplet accumulated is not greater than the volume of the fluid collection section 324, the isolation structure 325 may confine the droplet within the fluid collection section 324; once the amount of the droplet accumulated is greater than the volume of the fluid collection section 324, the droplet will overflow from the fluid collection section 324 and across the isolation structure 325 and flow to the spacing section 323.

In this embodiment, the microfluidic detection unit 3 further comprises a plurality of atmosphere communication channels 380. Each atmosphere communication channel 380 has one end in direct communication with the fluid storage section 320 and the other end extended to the surface on one side of the substrate 300 to communicate with the atmosphere. The design described above enables the microfluidic detection unit 3 to provide multiple paths in communication with the atmosphere, such that the microfluidic detection unit 3 can perform fluid detection normally even when one atmosphere communication channel is blocked or clogged, and the fluid pressure in the microfluidic detection unit 3 may reach equilibrium more easily.

Figure 11A:
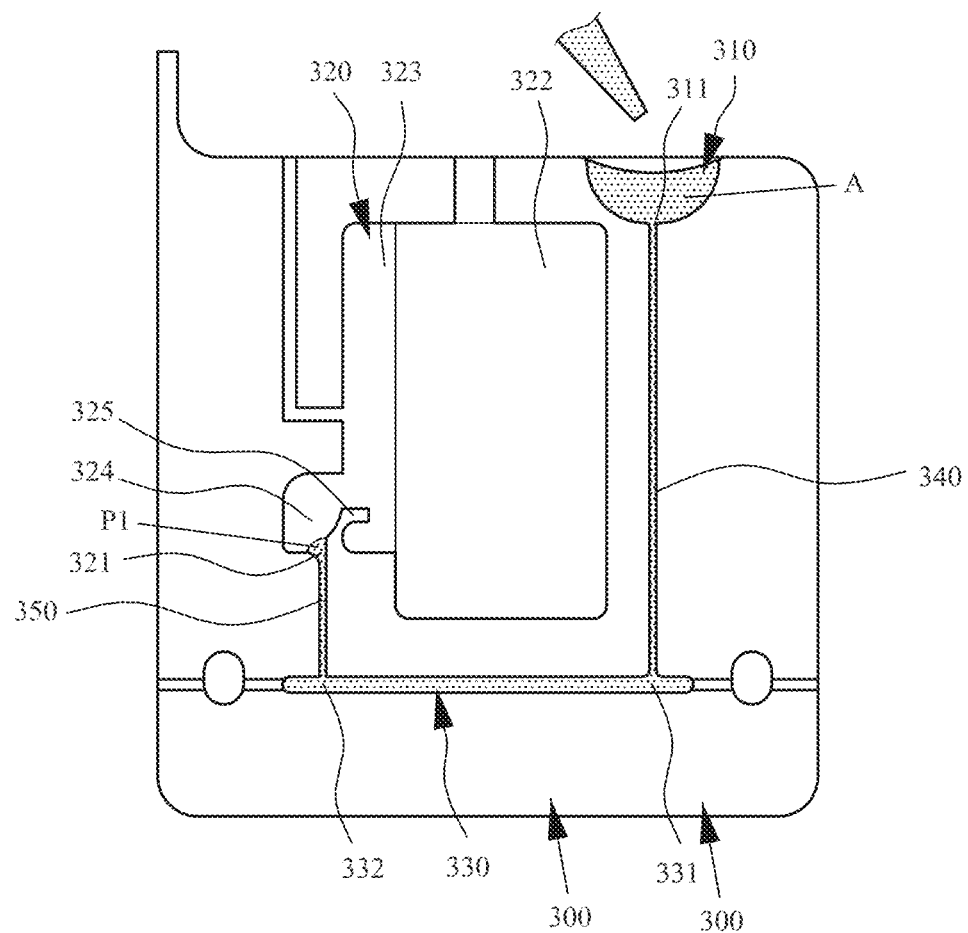
FIG. 11A to FIG. 11E illustrate the process of operating a third embodiment of the microfluidic detection unit of the present disclosure.
Figure 11B:
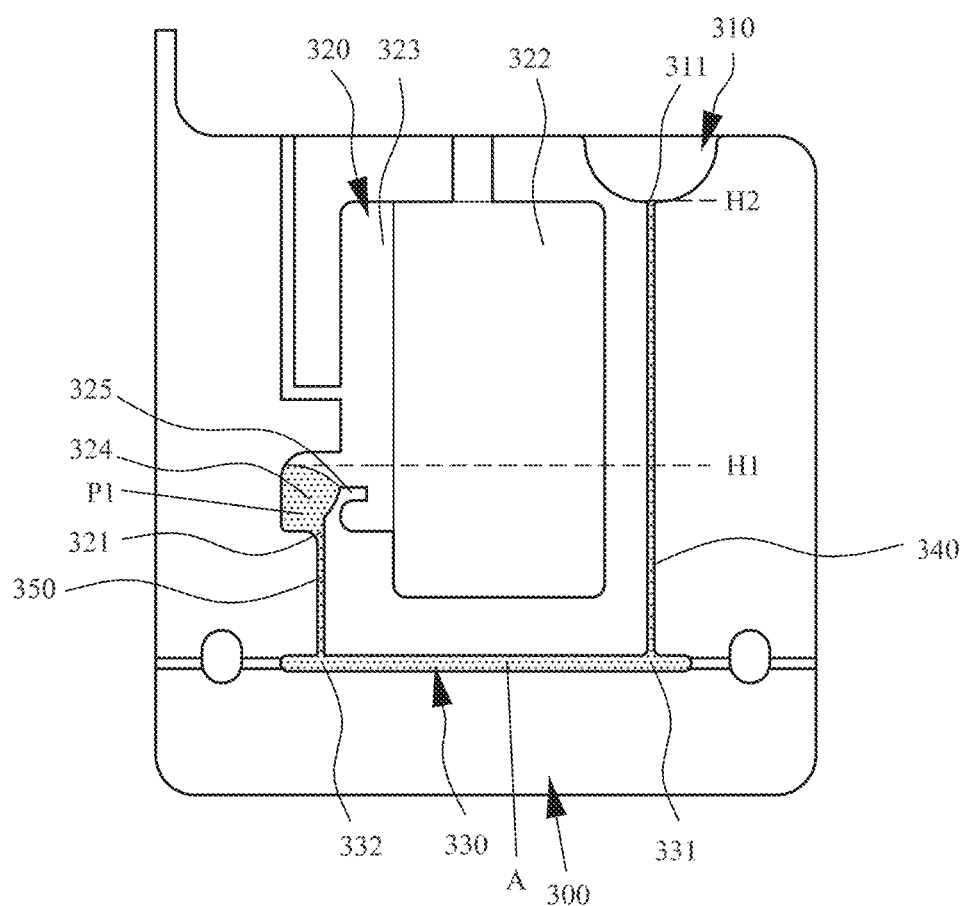
Figure 11C:
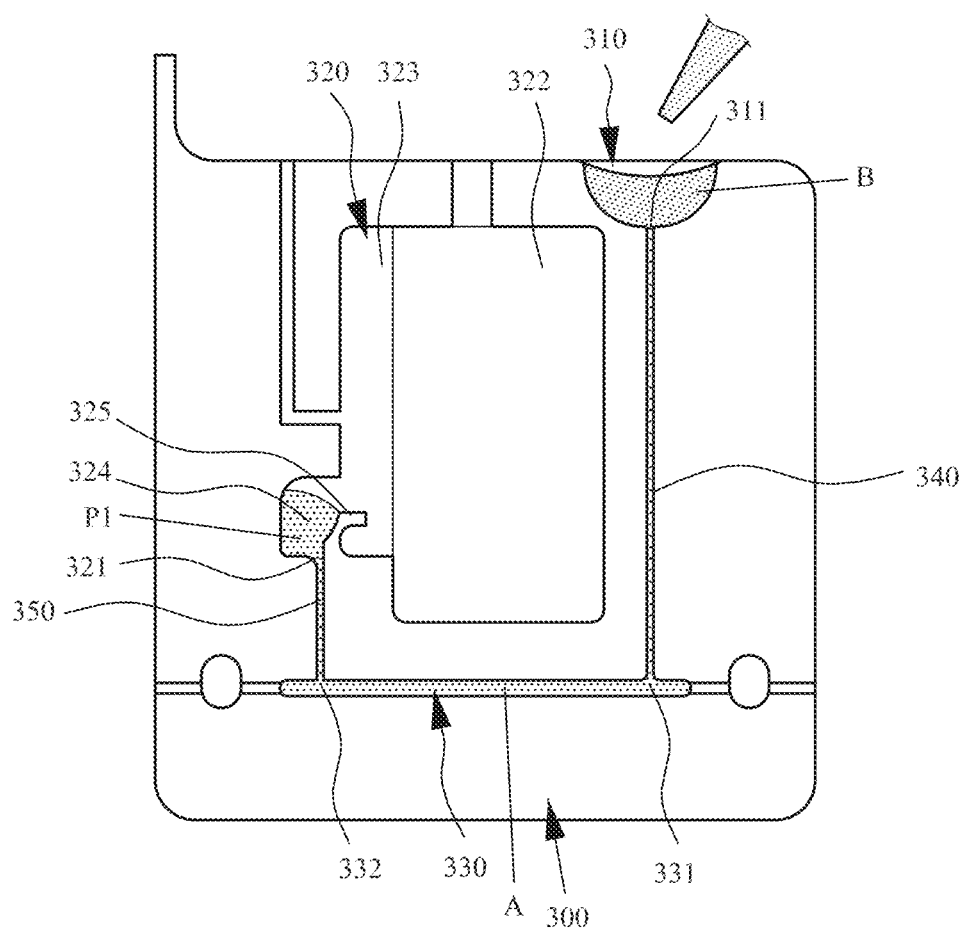
Figure 11D:
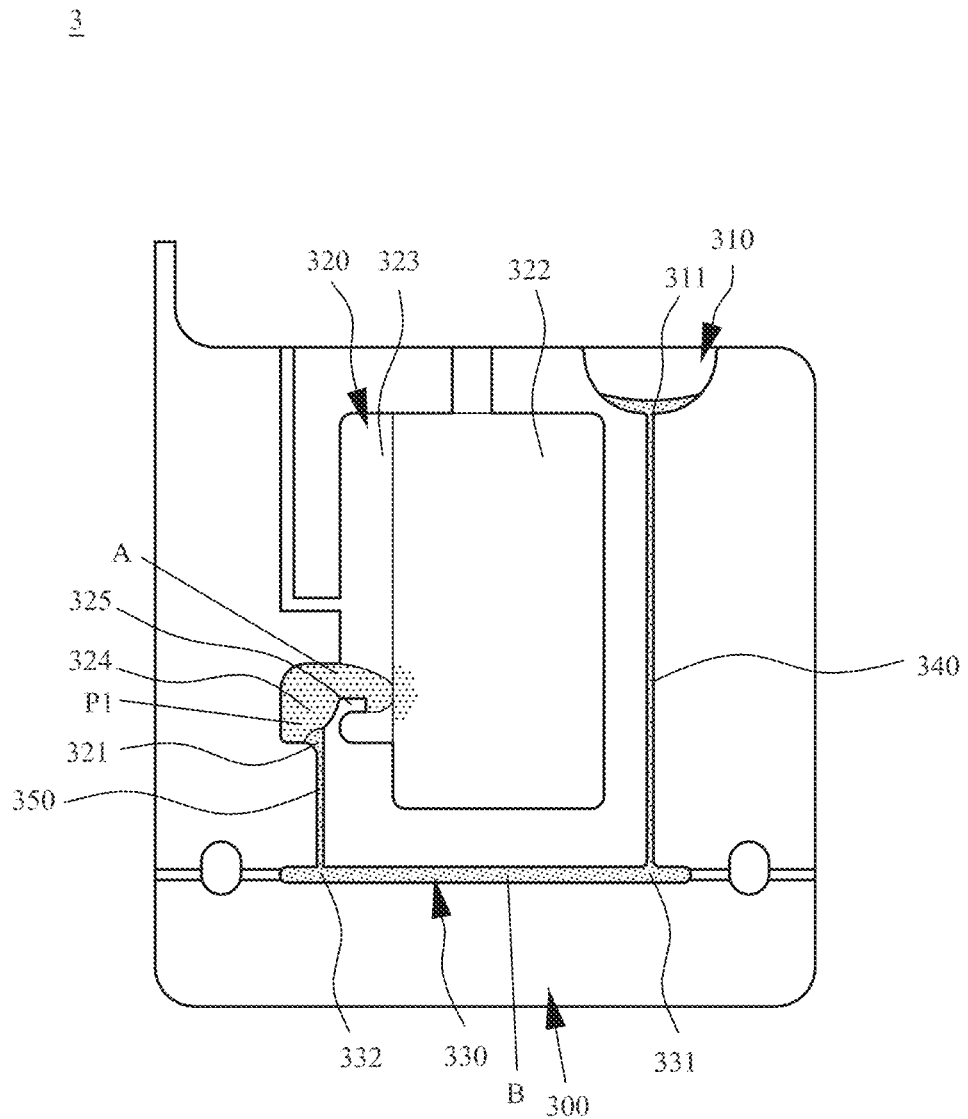
Figure 11E:
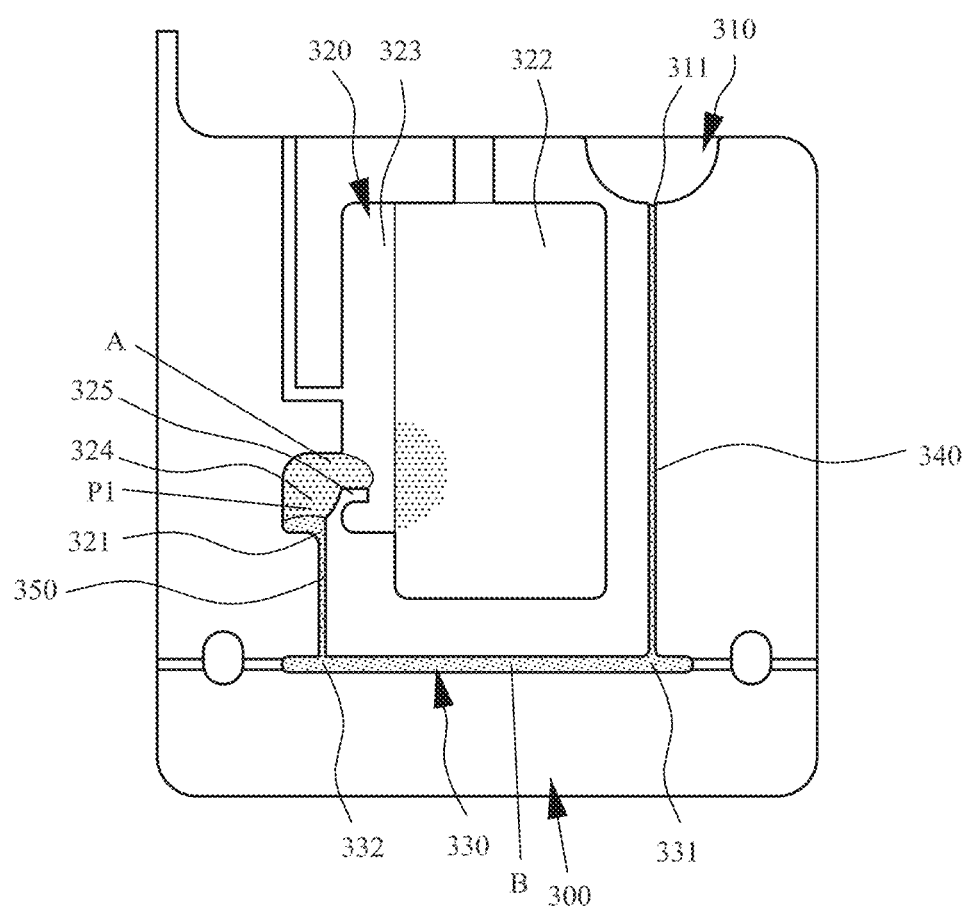

Refer now to FIG. 10 to FIG. 11E. FIG. 11A to FIG. 11E illustrate the process of operating a third embodiment of the microfluidic detection unit of the present disclosure. By reference to the third embodiment of the microfluidic detection unit 3 described above, as shown in FIG. 10, first the bottom surface 301 of the substrate 300 of the microfluidic detection unit 3 is set on any horizontal surface, such that the microfluidic detection unit 3 is substantially perpendicular to the horizontal surface to enable the subsequent fluid detection process.

Next, as shown in FIG. 11A, a sufficient amount of the first fluid A is injected as one batch or gradually to the fluid injection section 310 of the microfluidic detection unit 3. The first fluid A in the fluid injection section 310 will be driven by gravity to pass through the fluid outlet 311 and flow to the detection section 330 from the first end 331 of the detection section 330 along the input channel 340; then the first fluid A passes through the detection section 330 and then leaves the detection section 330 from the second end 332 of the detection section 330 due to the law of communicating vessels and then flows toward the fluid storage section 320 along the output channel 350, such that the first fluid A converges at the fluid inlet 321 of the fluid storage section 320 and the fluid collection section 324 to form a droplet P1 which gradually expands toward the fluid collection section 324 as its accumulation amount increases. Because the droplet P1 is temporarily stored in the fluid collection section 324, the droplet P1 is allowed to accumulate to a certain amount. When the first fluid A in the microfluidic detection unit 3 has accumulated to a sufficient volume and overflowed to the fluid outlet 311 of the fluid injection section 310, a capillary force opposite to the direction of gravity formed by a portion of the first fluid A in the input channel 340 defined from the fluid outlet 311 of the fluid injection section 310 (a position H2 as shown in FIG. 11B) to a level of the same height as a surface of the upper edge of the droplet P1 (a position H1 as shown in FIG. 11B) will offset a gravitational potential between the fluid outlet 311 of the fluid injection section 310 and a level of the same height as a surface of the upper edge of the droplet P1. As such, the first fluid A in the microfluidic detection unit 3 will stop flowing due to the state of fluid pressure equilibrium, as illustrated in FIG. 11B. At that moment, further injection of the first fluid A from the fluid injection section 310 can be stopped, and the first fluid A in the detection section 330 may be detected.

After the detection of the first fluid A by using the microfluidic detection unit 3 disclosed herein, a sufficient amount of the second fluid B may be injected as one batch or gradually to the fluid injection section 310 of the microfluidic detection unit 3, as shown in FIG. 11C. The injected second fluid B increases the pressure in the fluid injection section 310 and breaks the fluid pressure equilibrium formed by the first fluid A in the microfluidic detection unit 3; thus, the first fluid A as a whole will be pushed by the second fluid B and move toward the fluid storage section 320, such that the accumulated amount of the droplet P1 increases gradually; when the accumulated amount of the droplet P1 is greater than the volume of the fluid collection section 324, the droplet P1 will overflow from the fluid collection section 324 and across the isolation structure 325 and flow to the spacing section 323. If the droplet P1 expands continuously, the droplet P1 will traverse from the spacing section 323 and become in contact with the porous material 322. At that moment, the droplet P1 being in contact with the porous material 322 will be absorbed by the porous material 322, thereby rapidly reducing the accumulation amount of the droplet P1, as shown in FIG. 11D. Therefore, the presence of gravity further facilitates the first fluid A to leave from the detection section 330 and enables the second fluid B to flow into and through the detection section 330, such that the first fluid A in the detection section 330 is completely replaced by the second fluid B.

When the second fluid B in the microfluidic detection unit 3 has accumulated to a sufficient volume, the excessive amount of the droplet P1 will be absorbed by the porous material 322 until the remaining droplet P1 is no longer in contact with the porous material 322 and resumes to a state of fluid pressure equilibrium as described above, as shown in FIG. 11E. As such, the second fluid B in the microfluidic detection unit 3 will stop flowing due to the state of fluid pressure equilibrium, during which further injection of the second fluid B to the fluid injection section 310 can be stopped, so as to use the second fluid B to achieve the washing purpose or to detect the second fluid B in the detection section 330. To use the microfluidic detection unit 3 of the present disclosure in multiple fluid injections, a same or different fluid may also be loaded from the fluid injection section 310 of the microfluidic detection unit 3.

Figure 12:
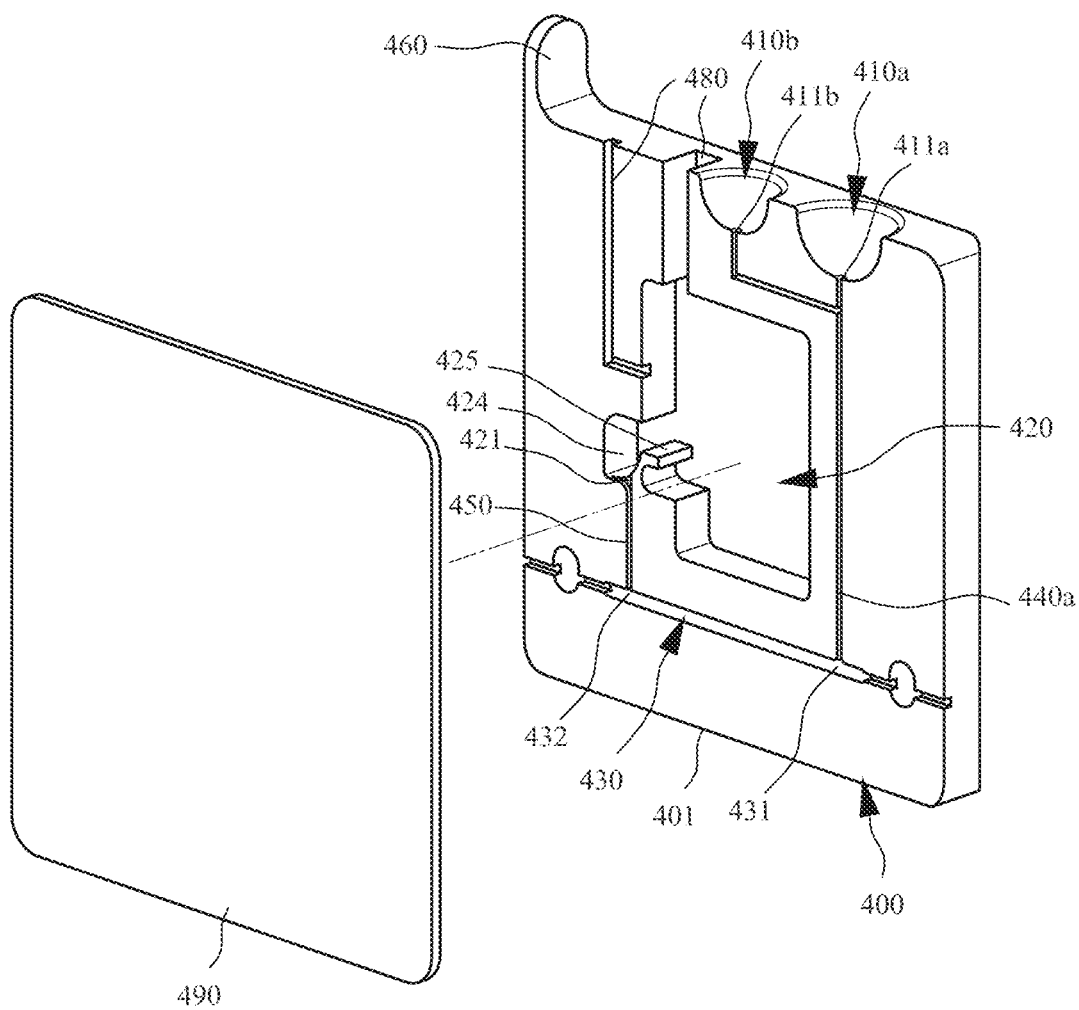
FIG. 12 illustrates the exploded view of a fourth embodiment of the microfluidic detection unit of the present disclosure.
Figure 13:
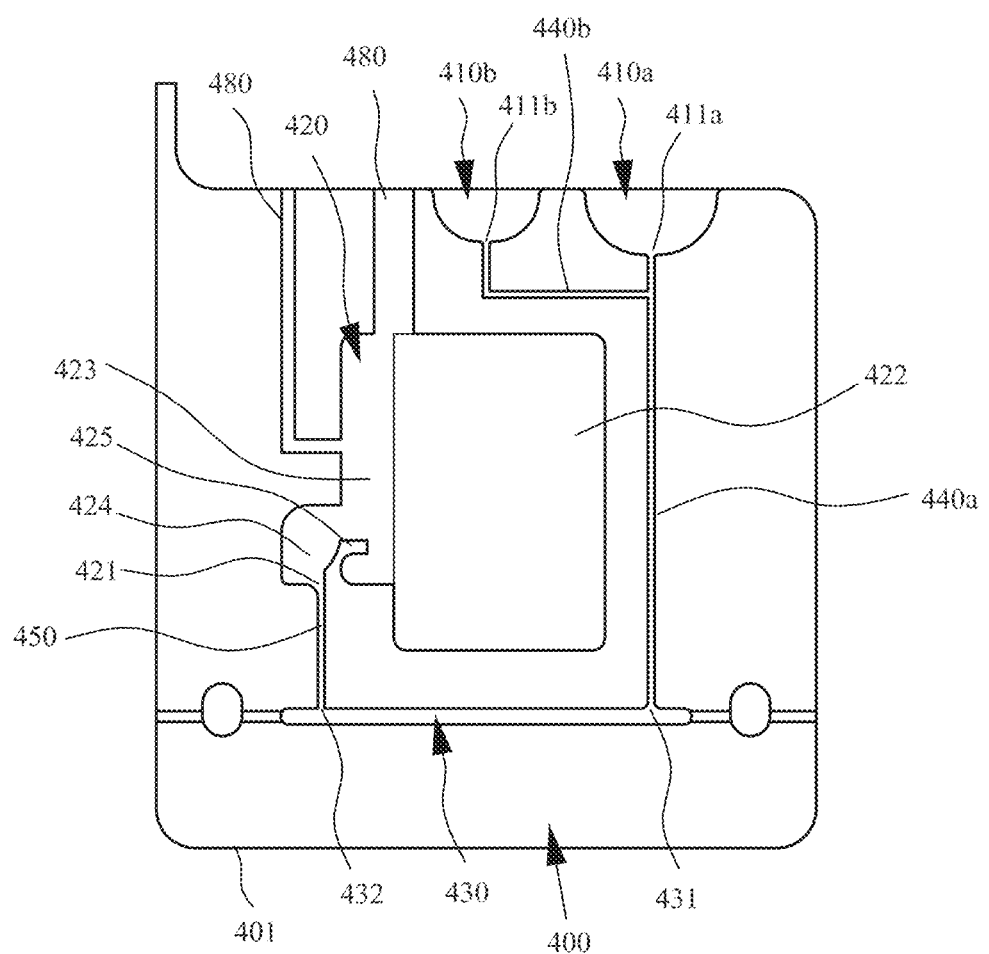
FIG. 13 illustrates the structure of the substrate of a fourth embodiment of the microfluidic detection unit of the present disclosure.

Refer now to FIG. 12 and FIG. 13. FIG. 12 illustrates the exploded view of a fourth embodiment of the microfluidic detection unit of the present disclosure, and FIG. 13 illustrates the side view of the substrate of a fourth embodiment of the microfluidic detection unit of the present disclosure. The fourth embodiment of the microfluidic detection unit is a variation of the second embodiment in conjunction with the third embodiment, in which the number of the fluid injection section, the structure of the fluid storage section and channel configuration are changed, the fluid buffer section of the fluid outlet is removed, and the remaining structural designs and functions are identical to the first embodiment and are therefore omitted for brevity.

As shown in FIG. 12 and FIG. 13, in the fourth embodiment of the microfluidic detection unit 4 according to the present disclosure, the microfluidic detection unit 4 comprises a substrate 400 and a cover 490 covered on one side of the substrate 400. The substrate 400 comprises a first fluid injection section 410a, a second fluid injection section 410b, a fluid storage section 420 and a detection section 430. The first fluid injection section 410a is communicated with the first end 431 of the detection section 430 from the fluid outlet 411a via the first channel 440a, and the second fluid injection section 410b is communicated with the first end 431 of the detection section 430 from the fluid outlet 411b via the second channel 440b; the fluid storage section 420 is communicated with the second end 432 of the detection section 430 from the fluid inlet 421 via the output channel 450. In this embodiment, the second channel 440b is communicated with the first channel 440a, such that the second fluid injection section 410b is in communication with the first end 431 of the detection section 430 via the second channel 440b and the first channel 440a, but the configuration of the second channel 440b is not limited to this embodiment. The shortest distance between the first fluid injection section 410a from the fluid outlet 411a and the bottom surface 401 is the vertical distance between the fluid outlet 411a and the bottom surface 401, the shortest distance between the second fluid injection section 410b from the fluid outlet 411b and the bottom surface 401 is the vertical distance between the fluid outlet 411b and the bottom surface 401, and the shortest distance between the fluid inlet 421 of the fluid storage section 420 and the bottom surface 401 is the vertical distance between the fluid inlet 421 and the bottom surface 401.

In this embodiment, a height difference is defined between the fluid outlet 411a of the first fluid injection section 410a and the fluid outlet 411b of the second fluid injection section 410b along the direction of gravity, and height differences are defined along the direction of gravity from the fluid inlet 421 of the fluid storage section 420 to the fluid outlet 411a of the first fluid injection section 410a and to the fluid outlet 411b of the second fluid injection section 410b respectively. For example, relative to the same bottom surface 401, the fluid outlet 411b of the second fluid injection section 410b is above (i.e., higher than) the fluid outlet 411a of the first fluid injection section 410a in the direction of gravity, such that a height difference is defined between the fluid outlet 411b of the second fluid injection section 410b and the fluid outlet 411a of the first fluid injection section 410a along the direction of gravity. In addition, relative to the same bottom surface 401, the shortest distance between the first fluid injection section 410a from the fluid outlet 411a and the bottom surface 401 and the shortest distance between the second fluid injection section 410b from the fluid outlet 411b and the bottom surface 401 are both greater than the shortest distance between the fluid inlet 421 of the fluid storage section 420 and the bottom surface 401, such that the fluid outlet 411a of the first fluid injection section 410a and the fluid outlet 411b of the second fluid injection section 410b both define a height difference along the direction of gravity in respect to the fluid inlet 421 of the fluid storage section 420. Accordingly, the fluid at the fluid outlet 411b of the second fluid injection section 410b has a gravitational potential of greater than that of the fluid at the fluid outlet 411a of the first fluid injection section 410a, and the fluid at the fluid outlet 411a of the first fluid injection section 410a or at the fluid outlet 411b of the second fluid injection section 410b has a gravitational potential of greater than that of the fluid at the fluid inlet 421 of the fluid storage section 420.

A spacing section 423 is defined between the porous material 422 in the fluid storage section 420 and the fluid inlet 421; the spacing section 423 separates and prevents contact of the porous material 422 and the fluid inlet 421 of the fluid storage section 420 to preserve a constant space. In addition, in this embodiment, the fluid storage section 420 further defines a fluid collection section 424. The fluid collection section 424 is arranged between the spacing section 423 and the fluid inlet 421. In addition, in this embodiment, the fluid storage section 420 further defines an isolation structure 425. The isolation structure 425 is used to isolate or separate the fluid collection section 424 and the spacing section 423 and served as a dam structure to prevent the droplet from overflowing from the fluid collection section 424.

In this embodiment, the microfluidic detection unit 4 further comprises a plurality of atmosphere communication channels 480. Each atmosphere communication channel 480 has one end in direct communication with the fluid storage section 420 and the other end extended to the surface on one side of the substrate 400 to communicate with the atmosphere.

Operation theory and usage of the fourth embodiment of the microfluidic detection unit 4 according to the present disclosure can be referred from the aforesaid second and third embodiments and are therefore omitted for brevity.

In summary, the microfluidic detection unit and the fluid detection method according to the present disclosure can make use of gravity to drive the fluid to flow, saving the installation costs of a conventional driver device and enabling the fluid to form a stable pressure equilibrium therein; in addition, the microfluidic detection unit and the fluid detection method according to the present disclosure allow multiple injections of a same or different fluid with one single device to achieve multiple fluid detection operations or the washing purpose, thereby reducing the detection costs and increasing the fluid detection efficiency.

The above detailed description is merely illustrative in nature and is not intended to limit the embodiments of the subject matter or the application and use of such embodiments. Moreover, while at least one exemplary example or embodiment has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A microfluidic detection unit for detecting a fluid and a biochemical or chemical reaction occurring therein, the microfluidic detection unit comprising:
   a substrate comprising:
   at least one fluid injection section, each fluid injection section defining a fluid outlet;
   a fluid storage section which is in gas communication with the atmosphere and defines a fluid inlet;
   a detection section defining a first end and a second end, the first end being in communication with the fluid outlet of the fluid injection section, the first end being configured to receive the fluid from the fluid injection section, and the second end being in communication with the fluid inlet of the fluid storage section, the second end being configured to output the fluid to the fluid storage section; and
   at least one input channel, each input channel communicating from the fluid outlet to the first end of the detection section;
   wherein a height difference is defined between the fluid outlet of the fluid injection section and the fluid inlet of the fluid storage section along a direction of gravity such that the fluid outlet of the fluid injection section has a gravitational potential of greater than that of the fluid inlet of the fluid storage section;
   wherein when a first fluid is injected from the at least one fluid injection section, the first fluid is driven by gravity to pass through the at least one input channel to enter the detection section and is stopped between the fluid outlet of the fluid injection section and the fluid storage section to accumulate to form a droplet at the fluid inlet of the fluid storage section, and a height along the direction of gravity of the droplet is between a bottom surface of the substrate and the fluid outlet of the fluid injection section, such that a gravitational potential and a capillary force opposite to the direction of gravity of a portion of the first fluid in the at least one input channel and between the fluid outlet and a position with the height along the direction of gravity of the droplet are offset to establish a state of fluid pressure equilibrium.

2. The microfluidic detection unit of claim 1, wherein the at least one fluid injection section comprises a first fluid injection section and a second fluid injection section, and the at least one input channel comprises a first channel and a second channel; the first fluid injection section being in communication with the first end of the detection section via the first channel, and the second fluid injection section being in communication with the first end of the detection section via the second channel.

3. The microfluidic detection unit of claim 2, wherein the fluid outlet of the second fluid injection section is above the fluid outlet of the first fluid injection section in the direction of gravity.

4. The microfluidic detection unit of claim 3, wherein the second channel has a cross-sectional size of greater than that of the first channel.

5. The microfluidic detection unit of claim 4, wherein the second channel is communicated with the first channel, such that the second fluid injection section is in communication with the first end of the detection section via the second channel and the first channel.

6. The microfluidic detection unit of claim 1, wherein the fluid outlet defines a fluid buffer section at an intersection of the fluid injection section and the fluid outlet.

7. The microfluidic detection unit of claim 6, wherein the fluid buffer section is at least a portion of a columnar space or a spherical space or has a curved surface structure.

8. The microfluidic detection unit of claim 6, wherein the fluid buffer section is provided therein with a porous material.

9. The microfluidic detection unit of claim 1, wherein the fluid storage section is provided therein with a porous material, and a spacing section is defined to prevent contact between the porous material and the fluid inlet of the fluid storage section.

10. The microfluidic detection unit of claim 9, wherein the fluid storage section further defines a fluid collection section between the spacing section and the fluid inlet for regulating an amount of the fluid flowing into the fluid storage section.

11. The microfluidic detection unit of claim 10, wherein the fluid storage section further defines an isolation structure for separating the fluid collection section and the spacing section.

12. The microfluidic detection unit of claim 1, wherein the detection section is provided with a detection component or a reactive material.

13. The microfluidic detection unit of claim 1, further comprising at least one atmosphere communication channel for maintaining the gas communication between the fluid storage section and the atmosphere.

14. The microfluidic detection unit of claim 1, further comprising at least one cover for covering at least one side of the substrate.

15. The microfluidic detection unit of claim 1, wherein the first end and the second end of the detection section are below the fluid outlet of the fluid injection section in the direction of gravity.

16. The microfluidic detection unit of claim 1, wherein the height difference defined between the fluid outlet and the fluid inlet along the direction of gravity ranges from 0.5 cm to 10 cm.

17. A fluid detection method comprising the following steps:

providing a microfluidic detection unit which comprises a detection section, at least one fluid injection section, a fluid storage section and at least one input channel;

injecting a first fluid from the at least one fluid injection section, such that the first fluid is driven by gravity to pass through the at least one input channel to enter the detection section and is stopped between the fluid outlet of the fluid injection section and the fluid storage section to accumulate to form a droplet at the fluid inlet of the fluid storage section, and a height along the direction of gravity of the droplet is between a bottom surface of the substrate and the fluid outlet of the fluid injection section, such that a gravitational potential and a capillary force opposite to a direction of gravity of a portion of the first fluid in the at least one input channel and between a fluid outlet of the at least one fluid injection section and a position with the height along the direction of gravity of the droplet are offset to establish a state of fluid pressure equilibrium; and detecting the first fluid in the detection section.

18. The fluid detection method of claim 17, further comprising:

injecting a second fluid from the at least one fluid injection section and reducing an amount of the droplet accumulated, so as to drive the first fluid to leave the detection section and enable the second fluid to pass through the at least one input channel to enter the detection section until a gravitational potential and a capillary force opposite to the direction of gravity of a portion of the second fluid in the at least one input channel and between the fluid outlet and a position with the height along the direction of gravity of the droplet are offset to establish the state of fluid pressure equilibrium.

19. The fluid detection method of claim 18, wherein a porous material is disposed in a vicinity of the fluid inlet without contact with the fluid inlet to absorb an excessive amount of the droplet accumulated.

20. The fluid detection method of claim 18, wherein a fluid collection section is defined in a vicinity of the fluid inlet, such that when the amount of the droplet accumulated is greater than a volume of the fluid collection section, the droplet overflows from the fluid collection section to reduce the amount of the droplet accumulated.

* * * * *